(12) United States Patent
Suzuki et al.

(10) Patent No.: US 11,710,885 B2
(45) Date of Patent: Jul. 25, 2023

(54) COMMUNICATION SYSTEM AND TRANSMITTER

(71) Applicant: Sony Semiconductor Solutions Corporation, Kanagawa (JP)

(72) Inventors: Hideyuki Suzuki, Kanagawa (JP); Hiroaki Hayashi, Kanagawa (JP); Hiroshi Shiroshita, Kanagawa (JP); Satoshi Ishigami, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 224 days.

(21) Appl. No.: 16/963,106

(22) PCT Filed: Jan. 11, 2019

(86) PCT No.: PCT/JP2019/000689
§ 371 (c)(1),
(2) Date: Jul. 17, 2020

(87) PCT Pub. No.: WO2019/146430
PCT Pub. Date: Aug. 1, 2019

(65) Prior Publication Data
US 2021/0367317 A1    Nov. 25, 2021

(30) Foreign Application Priority Data
Jan. 24, 2018    (JP) .................................. 2018-009330

(51) Int. Cl.
*H01P 5/18*    (2006.01)
*H04B 3/02*    (2006.01)

(52) U.S. Cl.
CPC .................. *H01P 5/18* (2013.01); *H04B 3/02* (2013.01)

(58) Field of Classification Search
CPC ................ H01P 5/12; H01P 5/16; H04B 3/02
See application file for complete search history.

(56) References Cited

U.S. PATENT DOCUMENTS

| | | | |
|---|---|---|---|
| 5,805,052 A | | 9/1998 | Hansemann et al. |
| 5,872,491 A | * | 2/1999 | Kim ......................... H01P 1/10 333/101 |

(Continued)

FOREIGN PATENT DOCUMENTS

| CN | 102017481 A | 4/2014 |
|---|---|---|
| CN | 104735387 A | 6/2015 |

(Continued)

OTHER PUBLICATIONS

Chinese Office Action dated Apr. 20, 2021 for corresponding Chinese Application No. 2019800071084.

Primary Examiner — Hafizur Rahman
Assistant Examiner — Alan Wong
(74) Attorney, Agent, or Firm — Michael Best & Friedrich LLP

(57) ABSTRACT

A communication system according to an embodiment of the present disclosure is a communication system that transmits a signal from a plurality of transmission devices to one reception device via a transmission path. In the communication system, the transmission path includes a branch point at a midpoint, includes a plurality of first signal lines that couples the transmission devices and the branch point to each other, and further includes a second signal line that couples the branch point and the reception device to each other. Of the plurality of first signal lines or the second signal line, at least the plurality of first signal lines has a resistor element in proximity to the branch point.

10 Claims, 22 Drawing Sheets

(56) References Cited

U.S. PATENT DOCUMENTS

| | | | | |
|---|---|---|---|---|
| 8,649,445 | B2 * | 2/2014 | Cronie | H04L 25/4908 |
| | | | | 331/25 |
| 9,535,150 | B1 * | 1/2017 | Lutz | G01R 35/005 |
| 10,200,222 | B2 * | 2/2019 | Hairfield | H03F 3/45475 |
| 2018/0074990 | A1 * | 3/2018 | Matsumoto | G06F 13/4086 |

FOREIGN PATENT DOCUMENTS

| | | | |
|---|---|---|---|
| CN | 105871353 A | 8/2016 | |
| CN | 107409107 A | 11/2017 | |
| JP | 2005-045729 A | 2/2005 | |
| JP | 2006-246280 A | 9/2006 | |
| JP | 2017-195500 A | 10/2017 | |
| WO | 2014/068772 A1 | 5/2014 | |
| WO | 2016/163252 A1 | 10/2016 | |
| WO | WO-2016163252 A1 * | 10/2016 | G06F 13/36 |

* cited by examiner

[ FIG. 1 ]
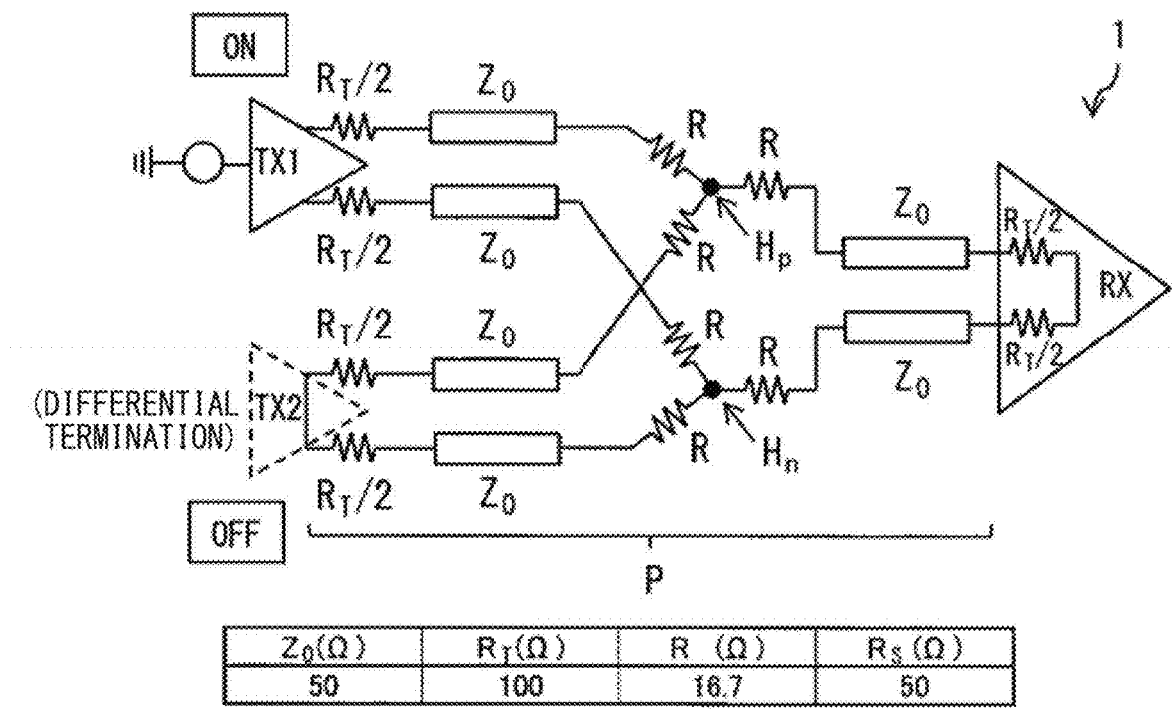
R = ((NUMBER OF BRANCHES − 1) × $Z_0$ − $R_T$/2) / NUMBER OF BRANCHES
[ FIG. 2 ]
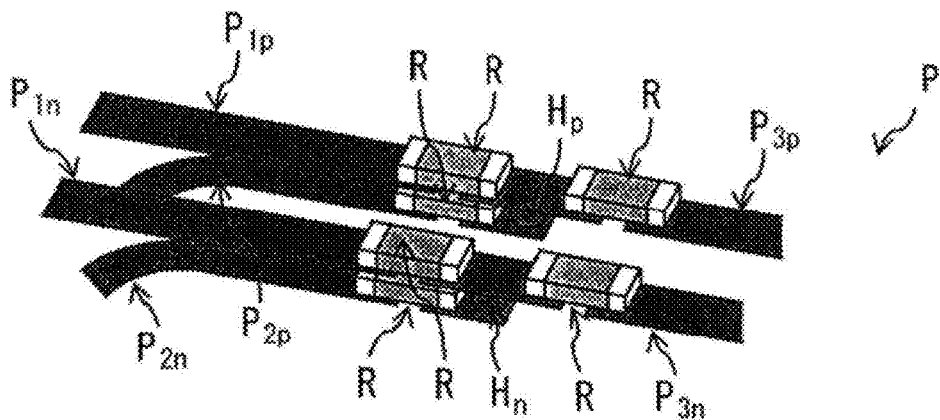

[FIG. 3]
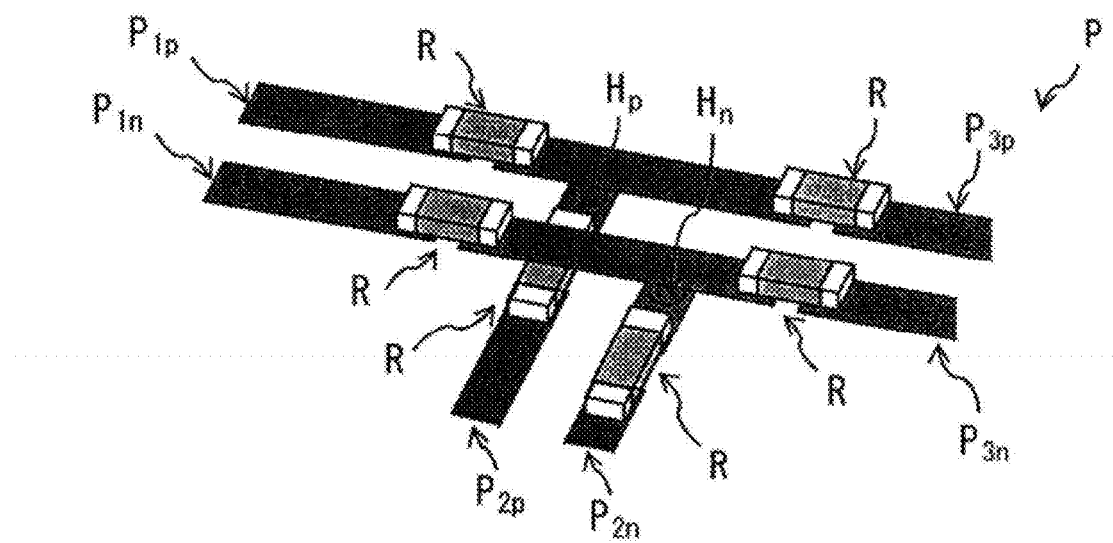
[FIG. 4]
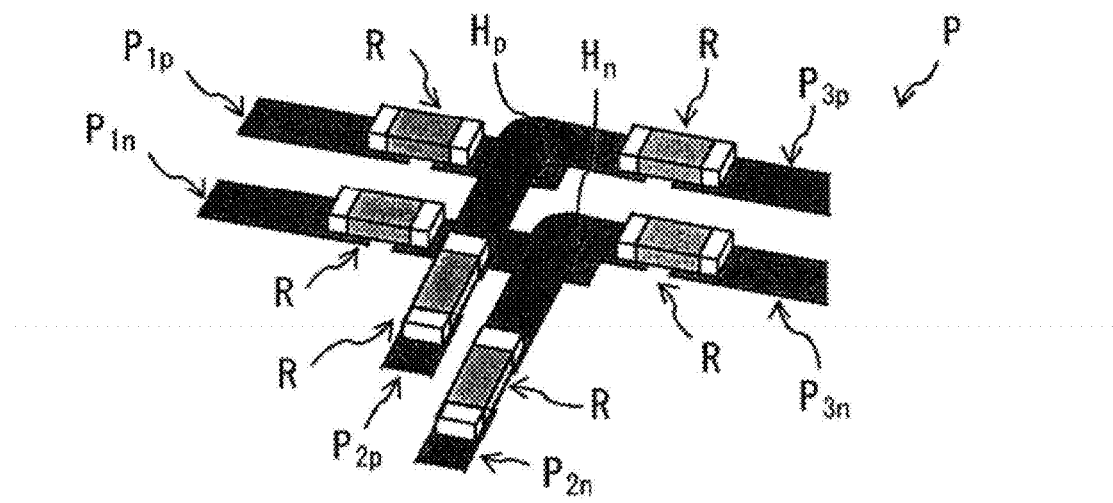

[ FIG. 5 ]
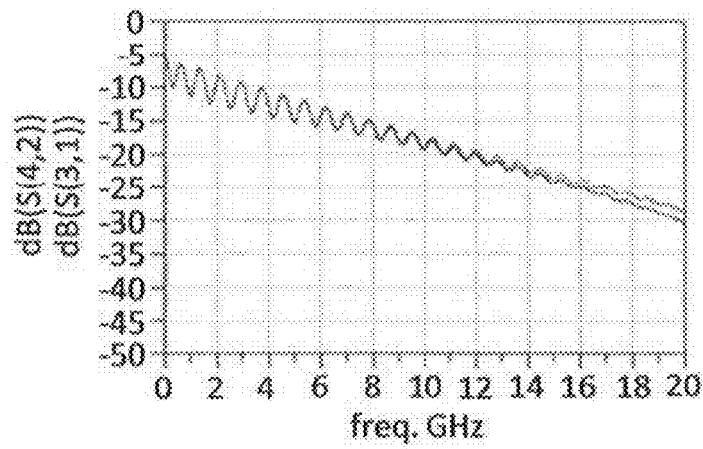
[ FIG. 6 ]
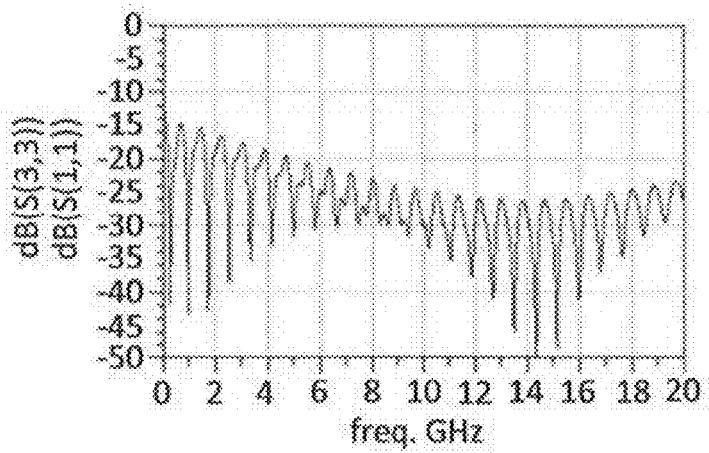
[ FIG. 7 ]
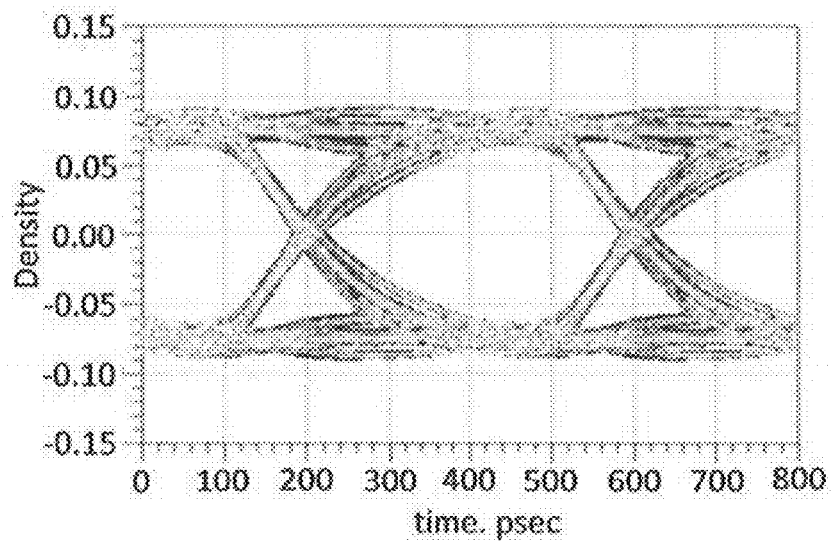

[ FIG. 8 ]
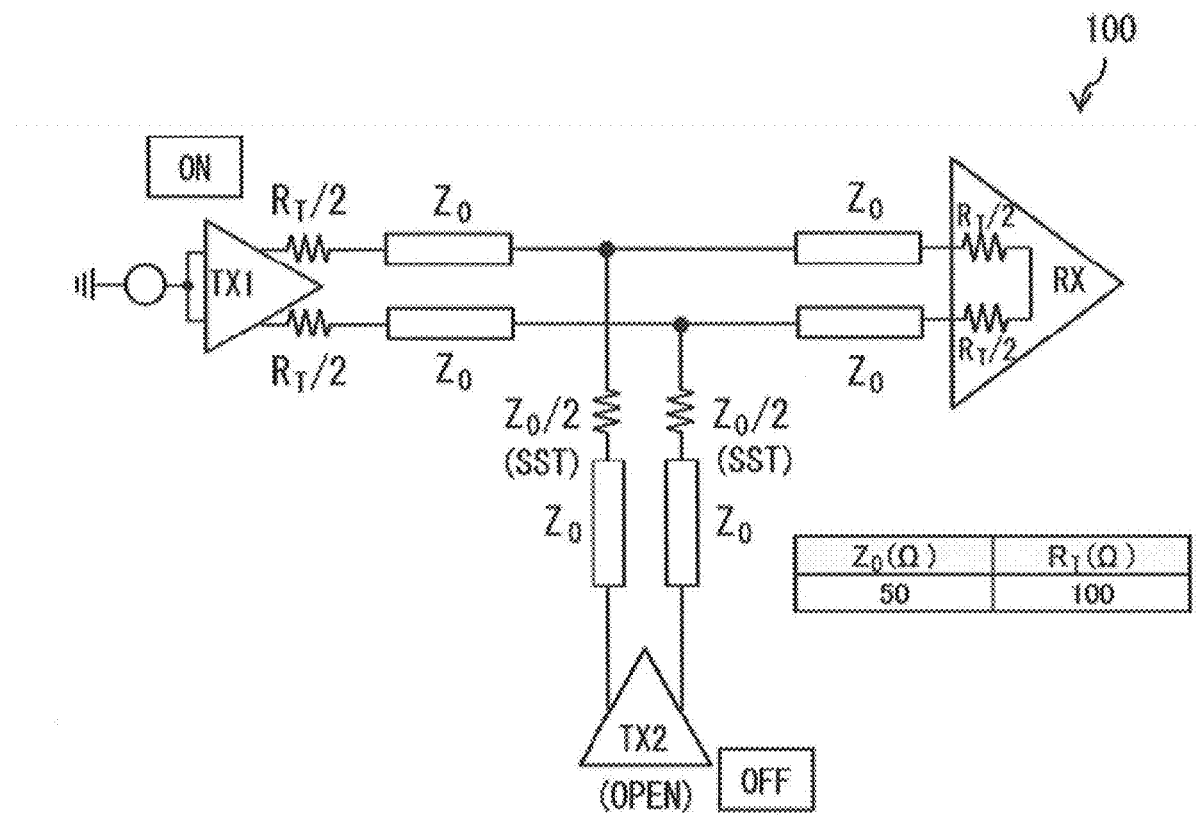
[ FIG. 9 ]
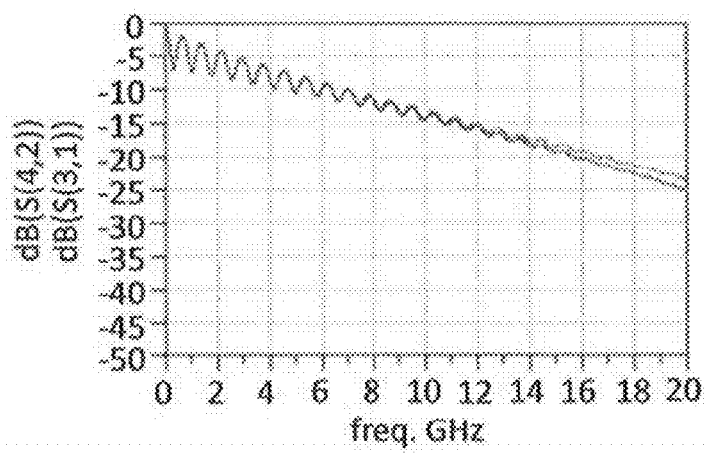

[ FIG. 10 ]
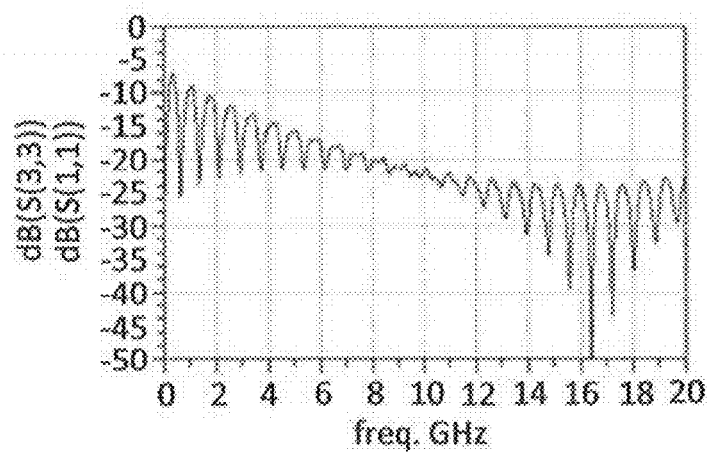
[ FIG. 11 ]
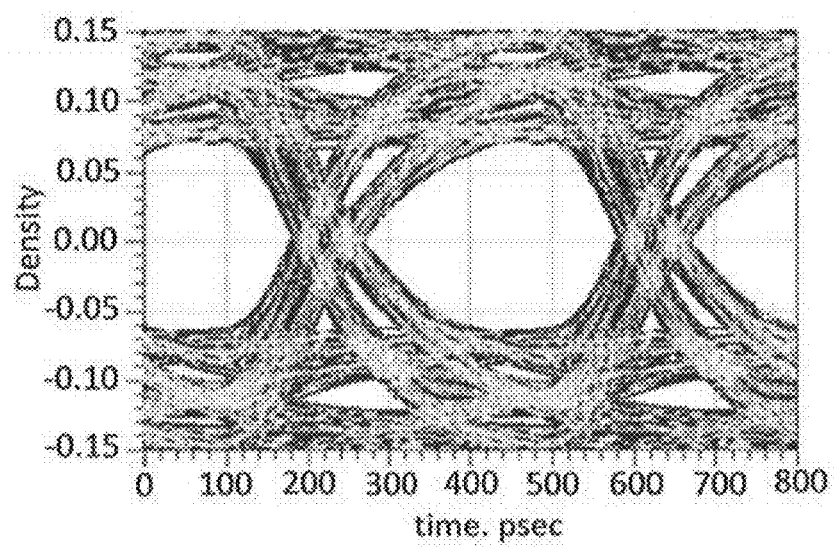

[ FIG. 12 ]
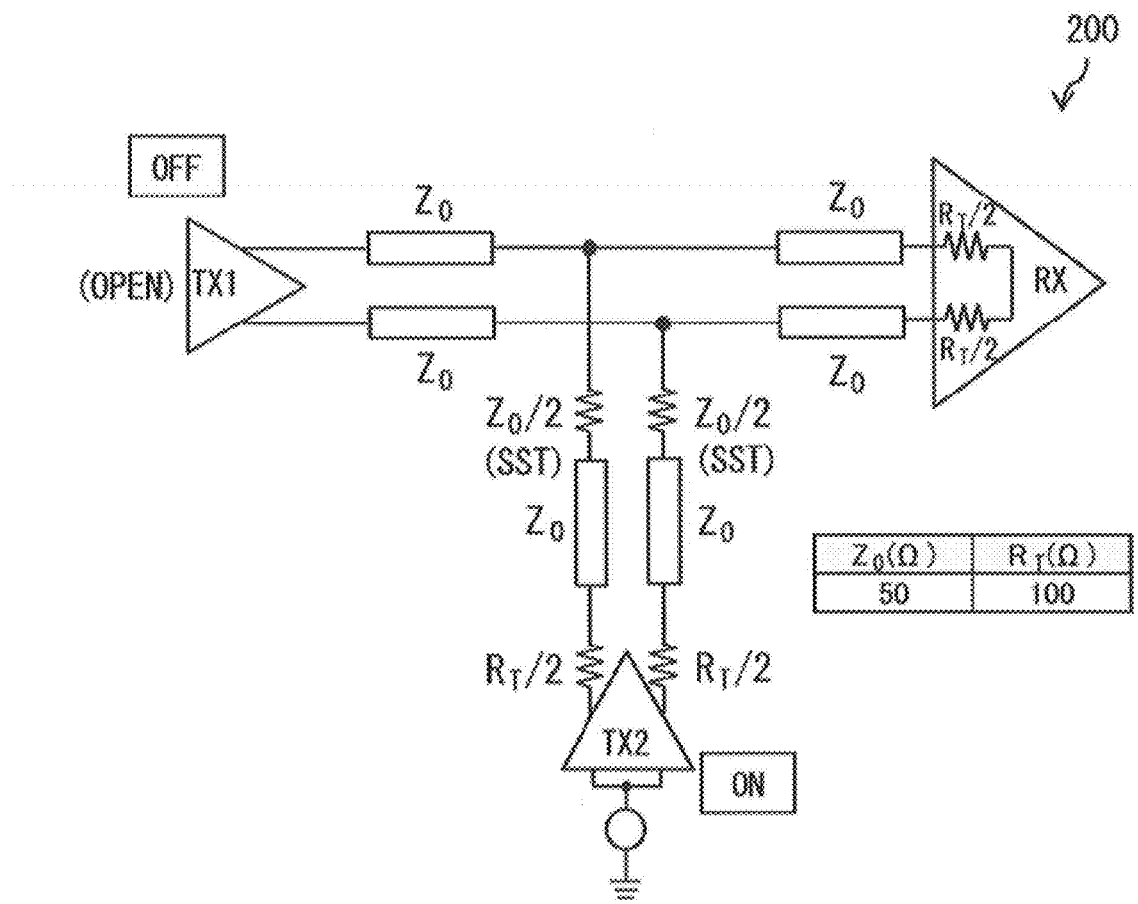
[ FIG. 13 ]
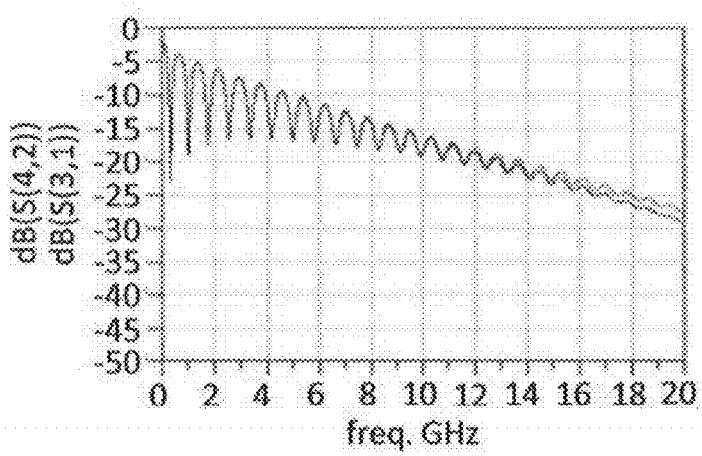

[ FIG. 14 ]
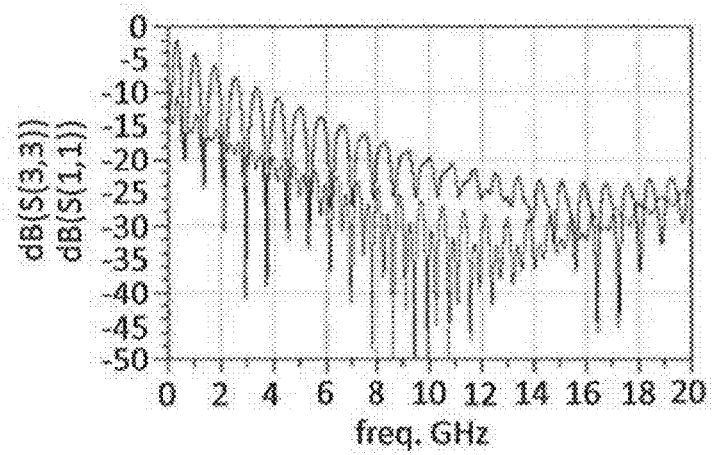
[ FIG. 15 ]
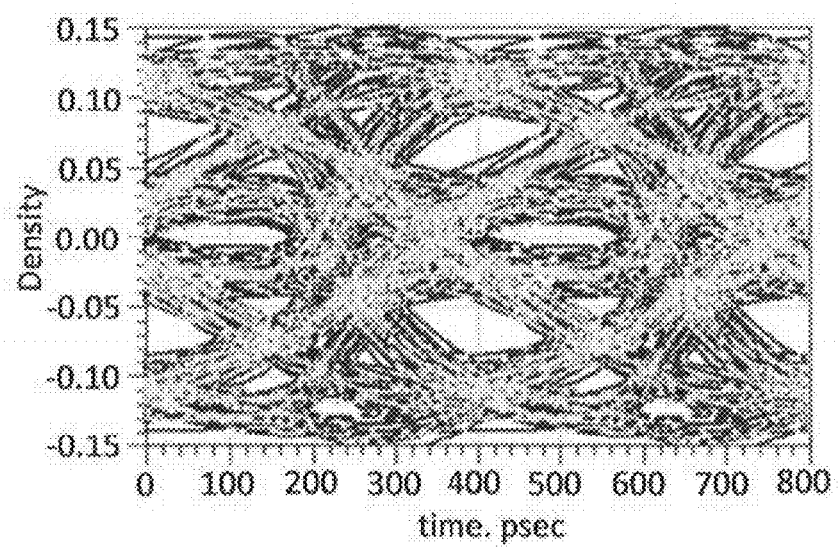

[ FIG. 16 ]
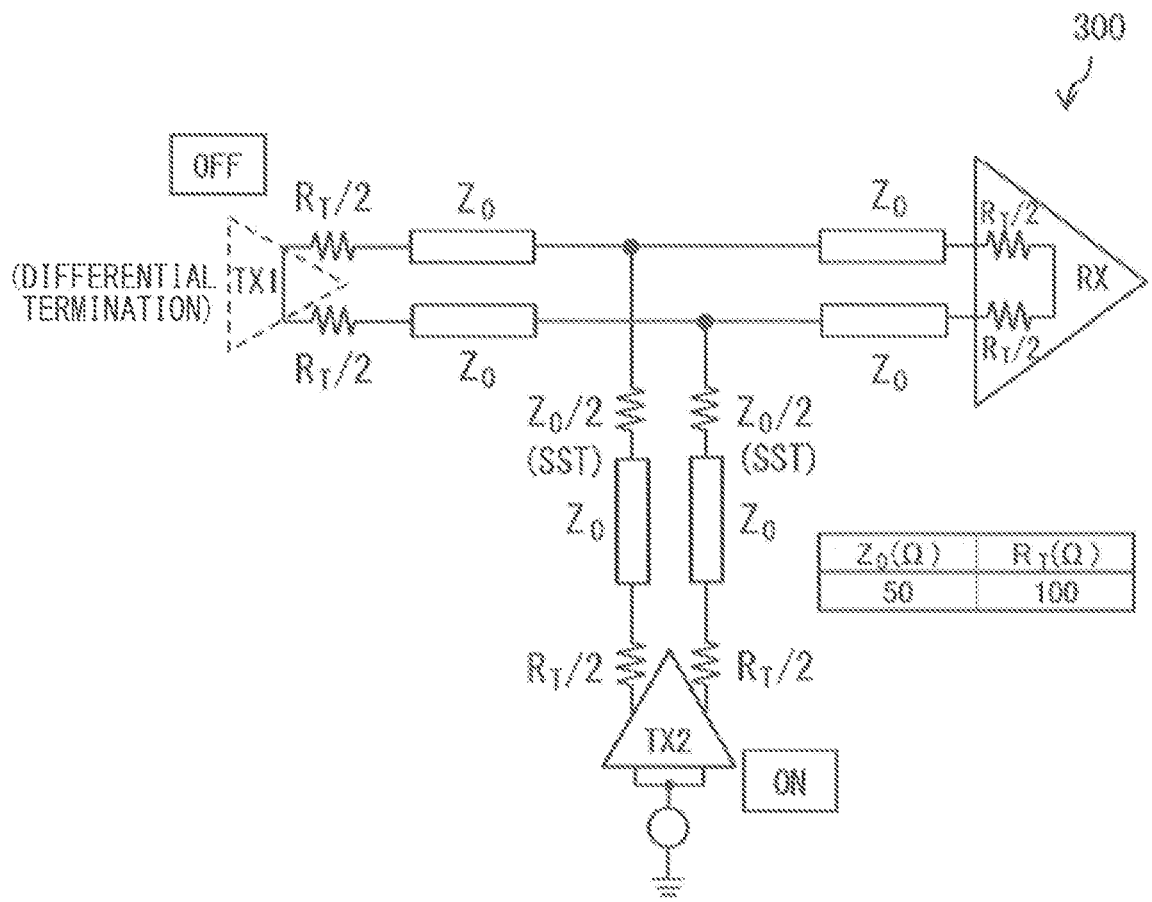
[ FIG. 17 ]
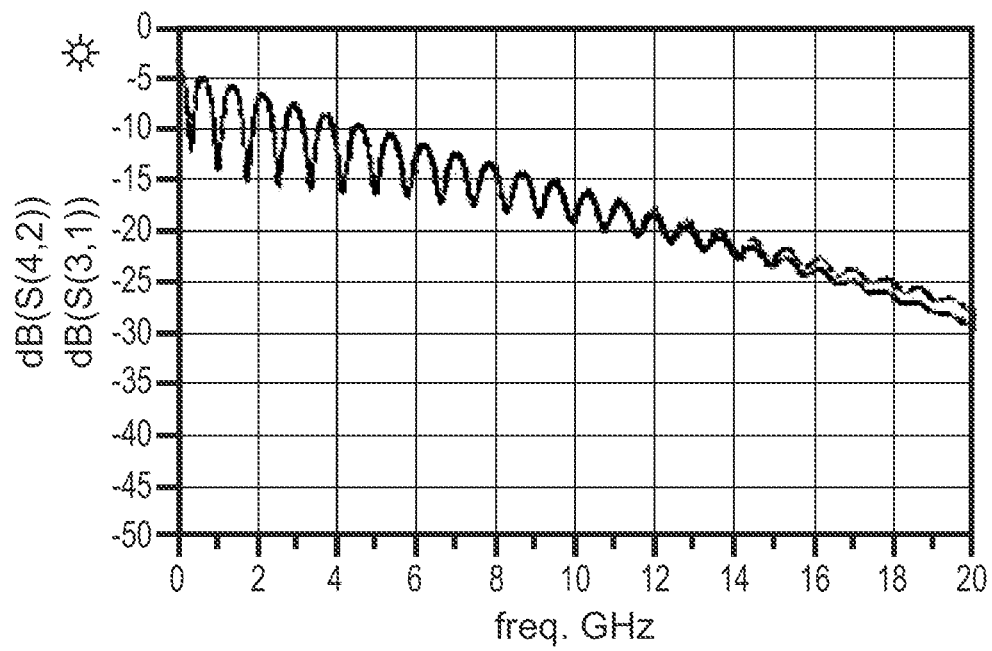

[ FIG. 18 ]
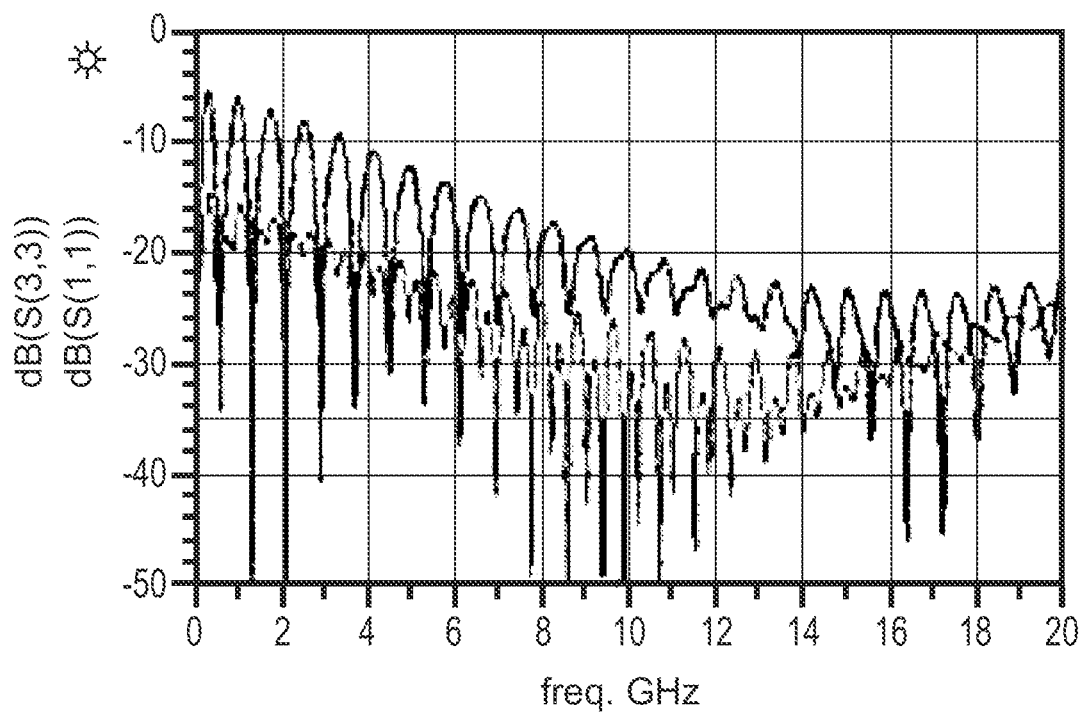
[ FIG. 19 ]
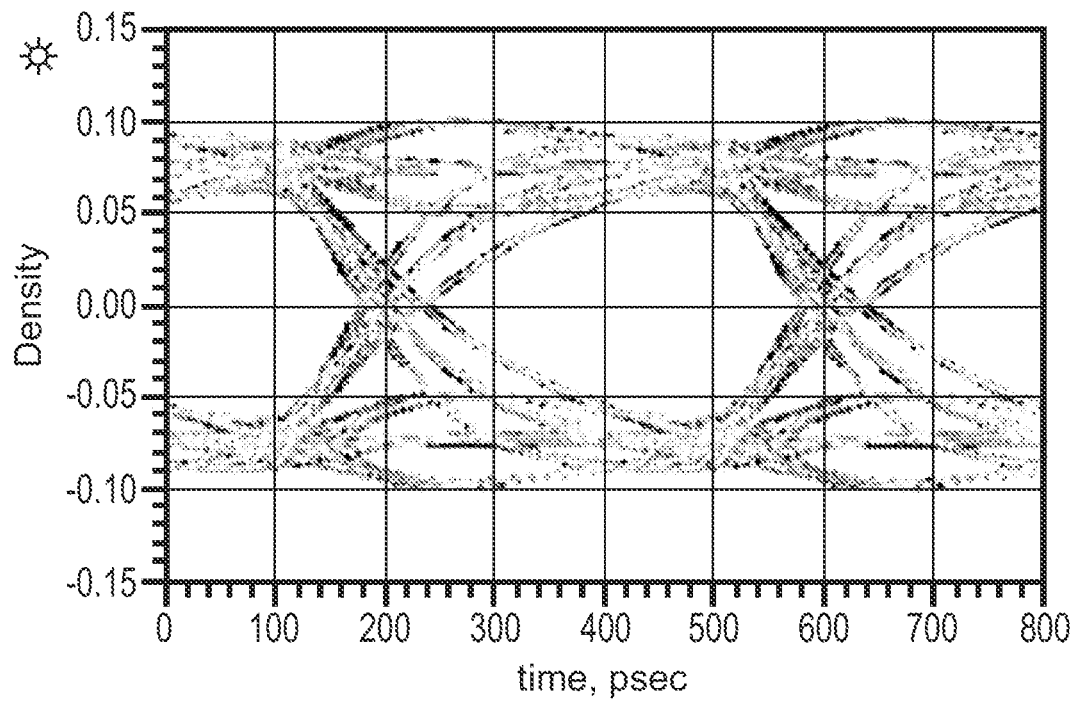

[ FIG. 20 ]
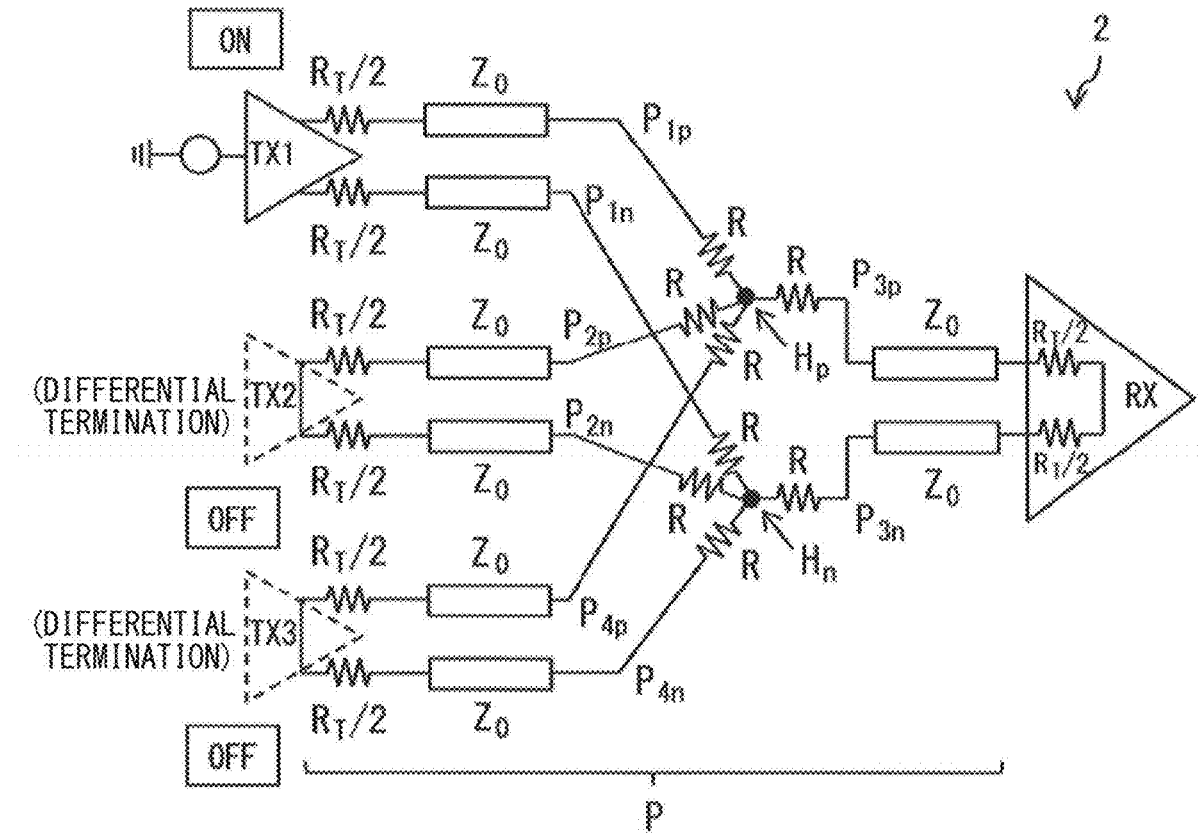
| $Z_0(\Omega)$ | $R_T(\Omega)$ | $R(\Omega)$ | $R_S(\Omega)$ |
|---|---|---|---|
| 50 | 100 | 25 | 50 |
$R = ((\text{NUMBER OF BRANCHES} - 1) \times Z_0 - R_T/2) / \text{NUMBER OF BRANCHES}$
[ FIG. 21 ]
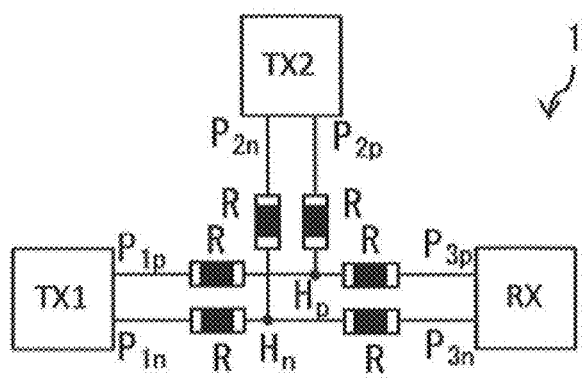

[FIG. 22]
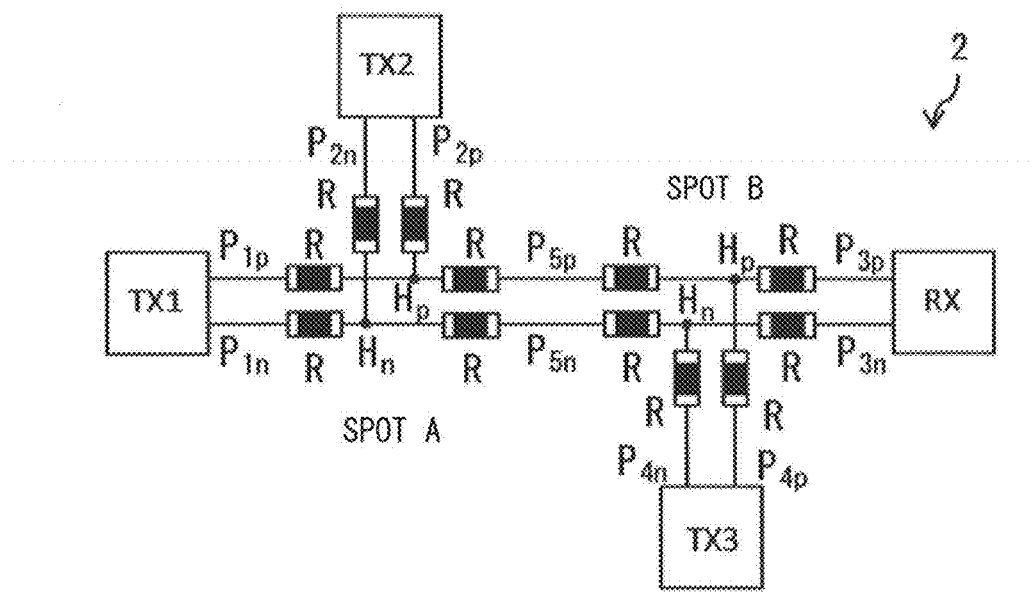
[FIG. 23]
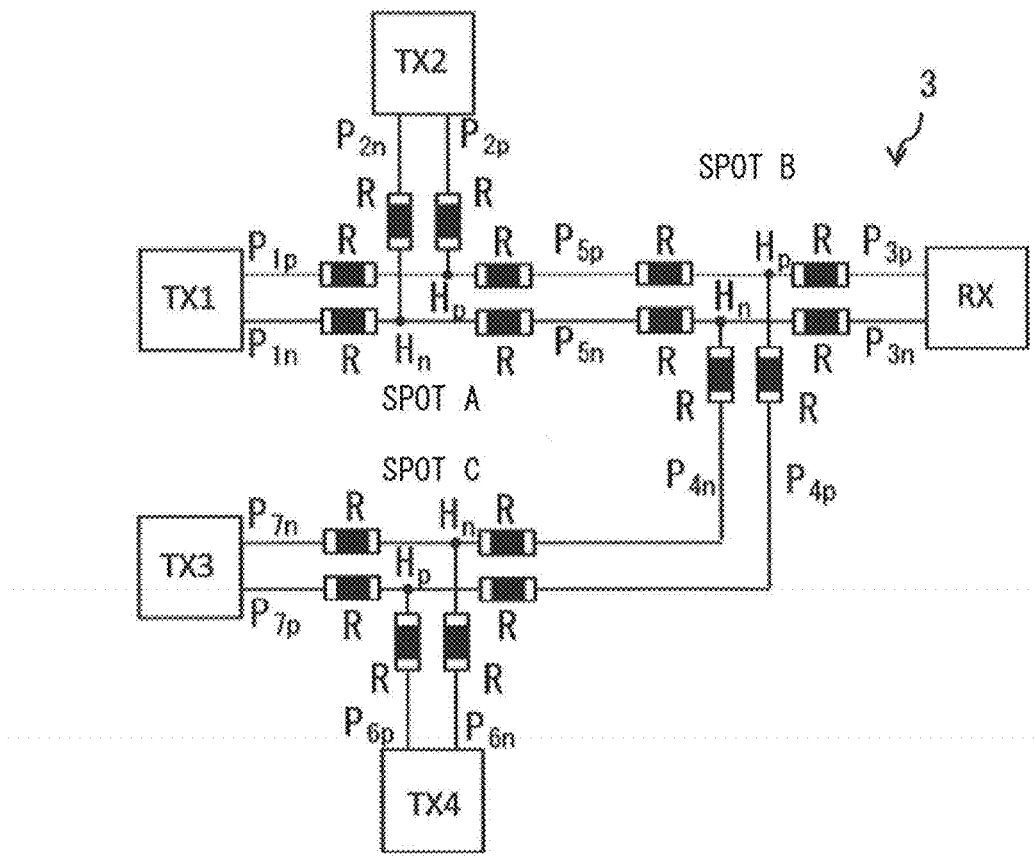

[ FIG. 24 ]
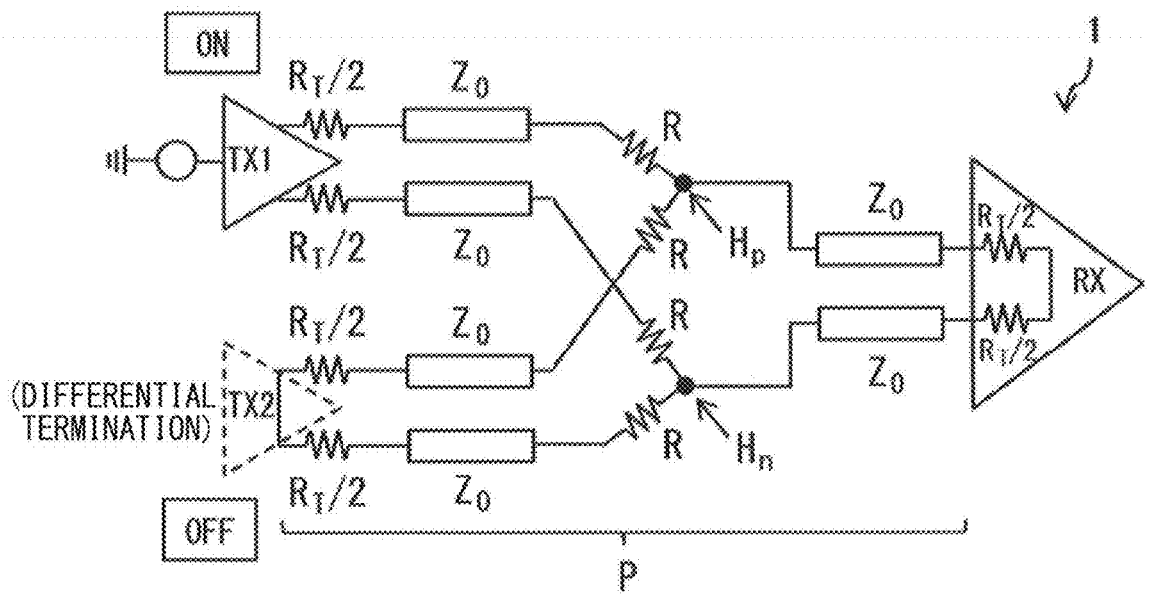
$$R^2 + \left(\frac{2}{3}R_T - Z_0\right)R + \frac{R_T}{2}\left(\frac{R_T}{2} - 2Z_0\right) = 0$$
[ FIG. 25 ]
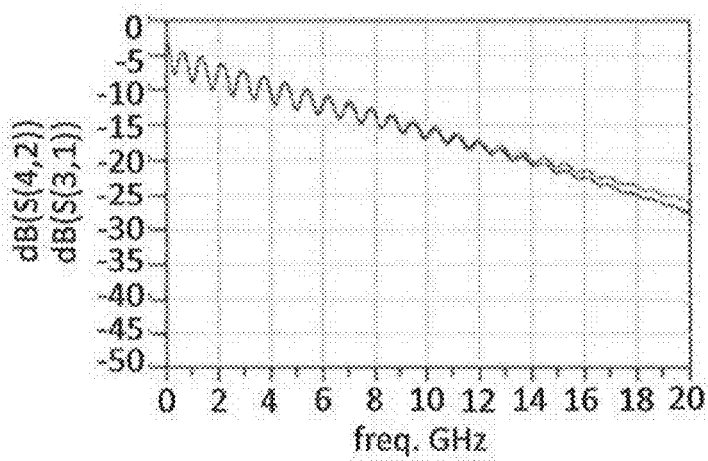

[ FIG. 26 ]
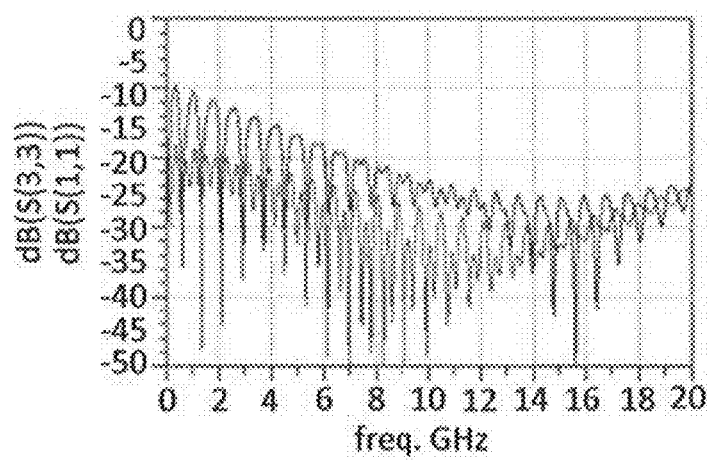
[ FIG. 27 ]
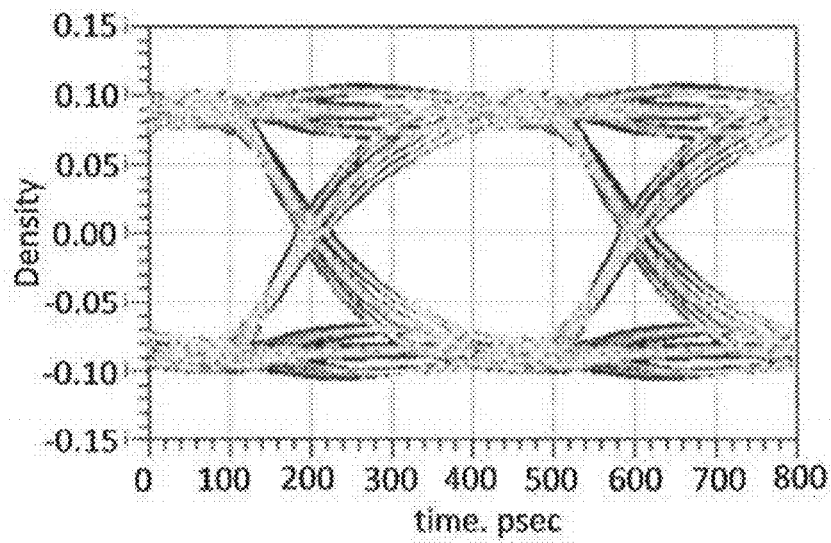

[ FIG. 28 ]
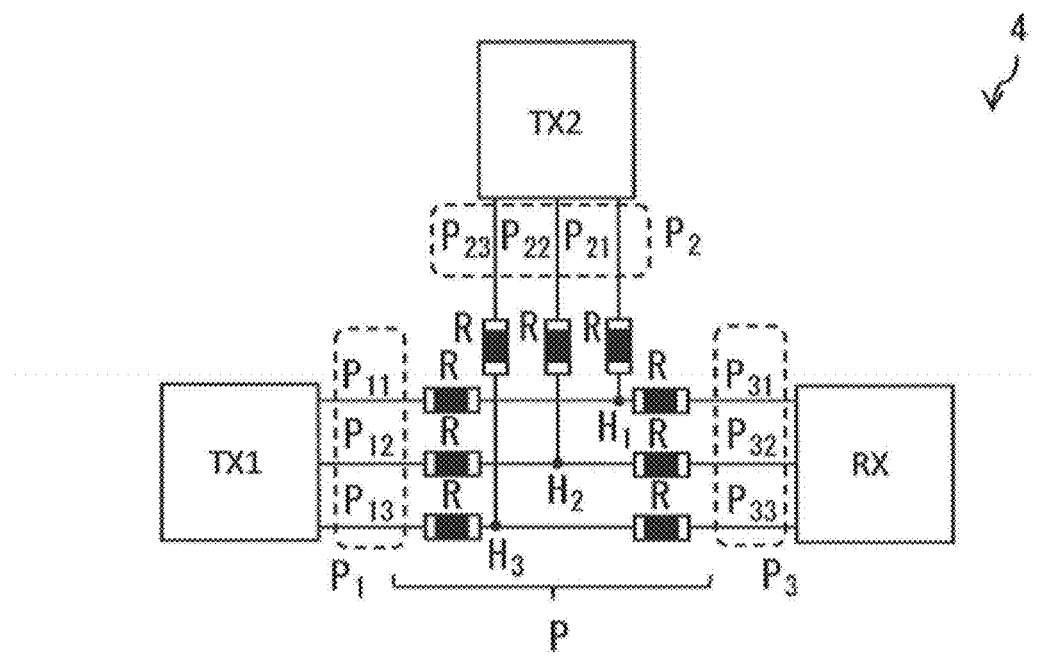
[ FIG. 29 ]
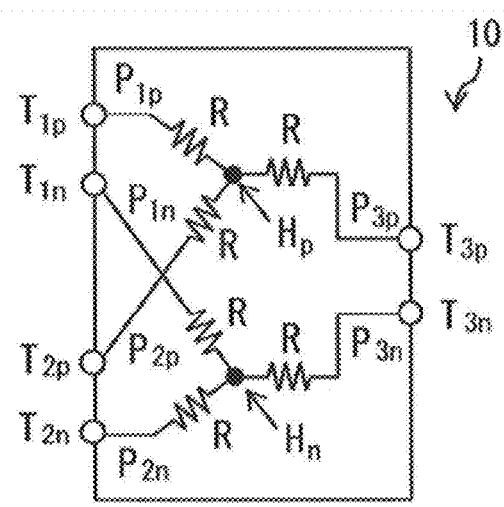

[ FIG. 30 ]
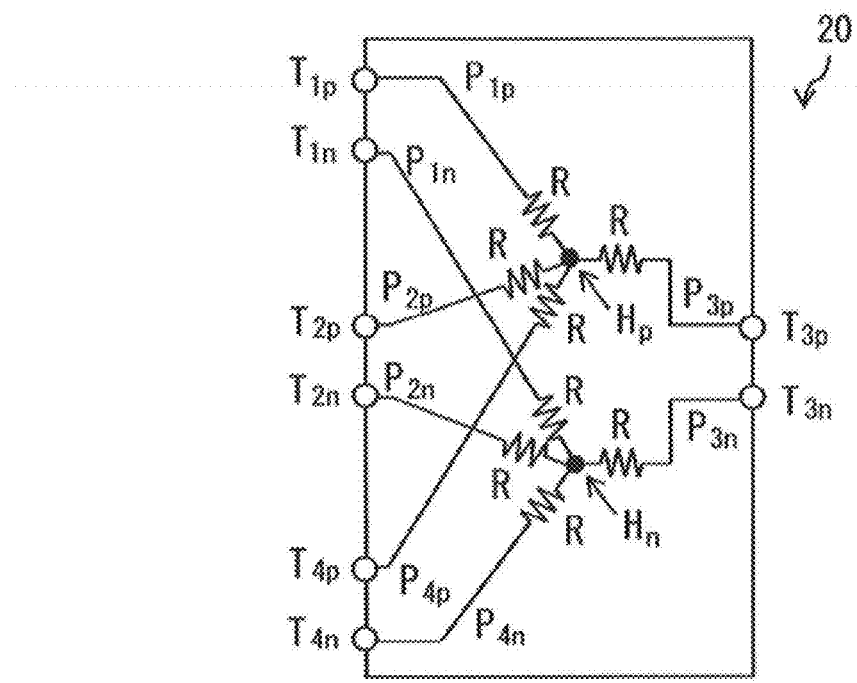
[ FIG. 31 ]
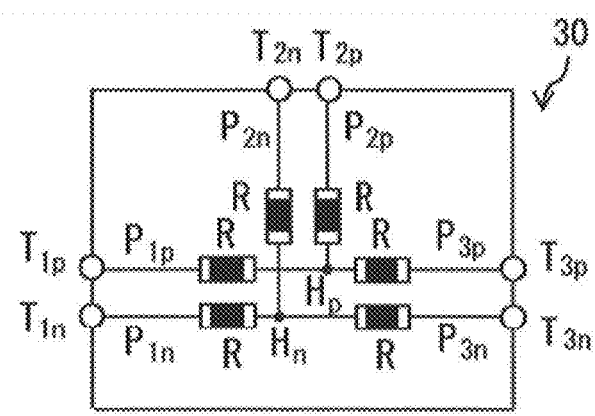

[ FIG. 32 ]
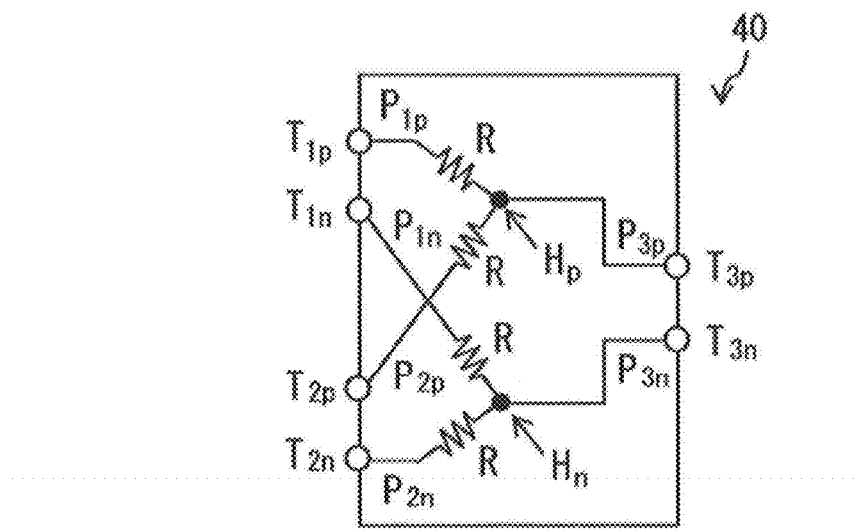
[ FIG. 33 ]
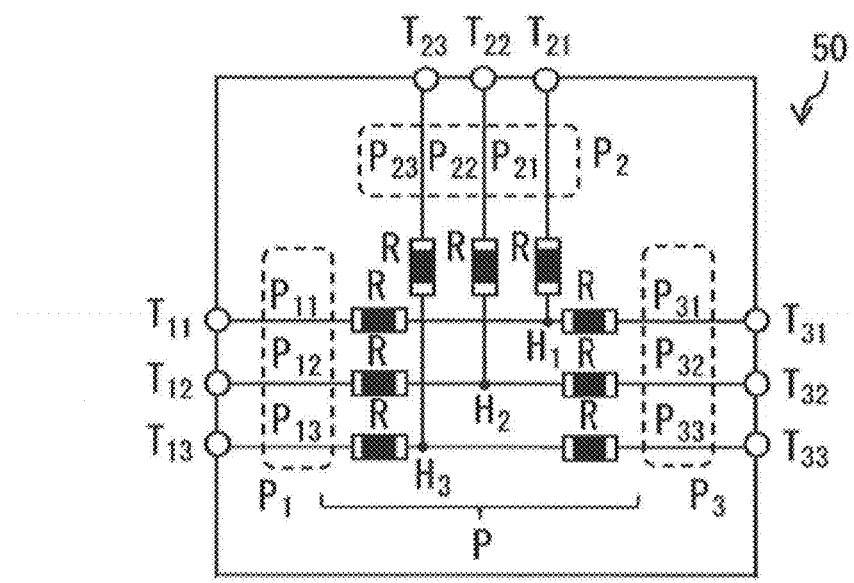

[ FIG. 34 ]
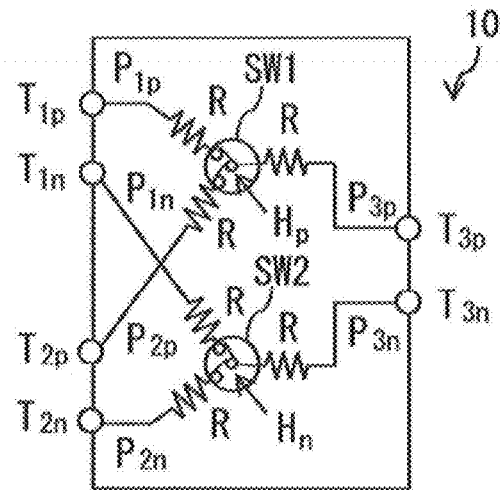
[ FIG. 35 ]
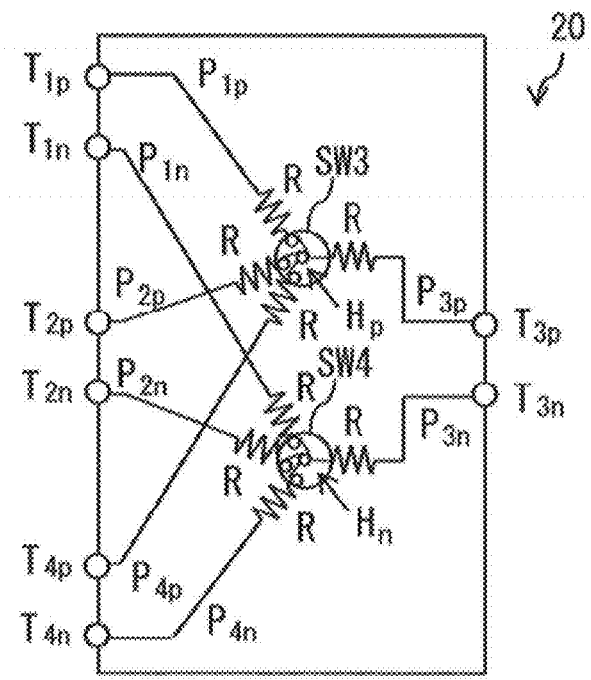

[ FIG. 36 ]
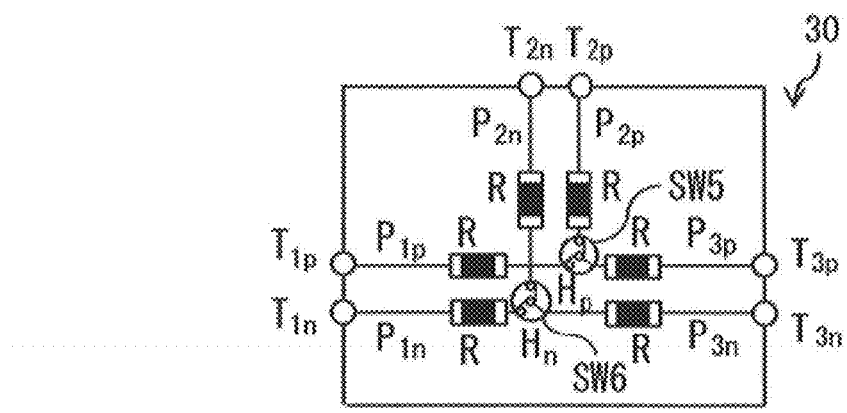
[ FIG. 37 ]
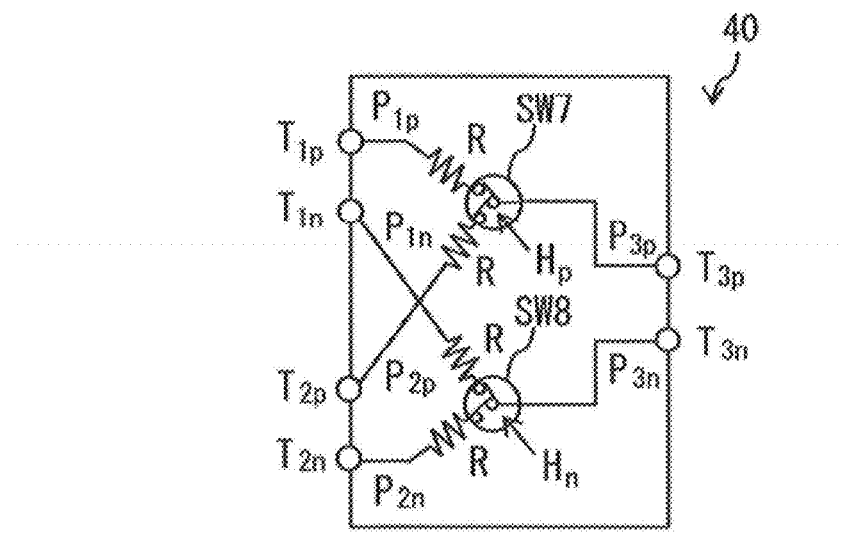

[ FIG. 38 ]
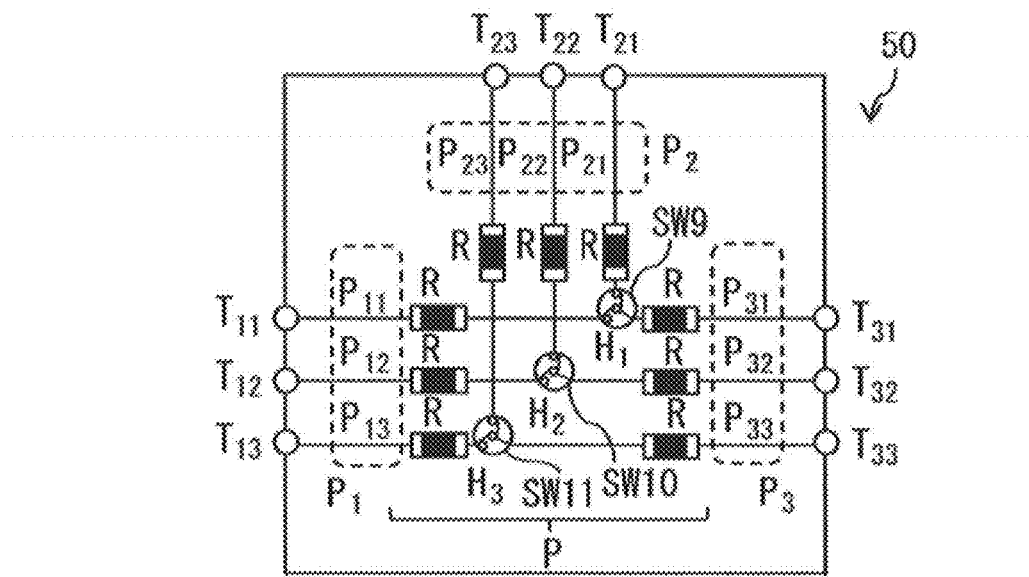
[ FIG. 39 ]
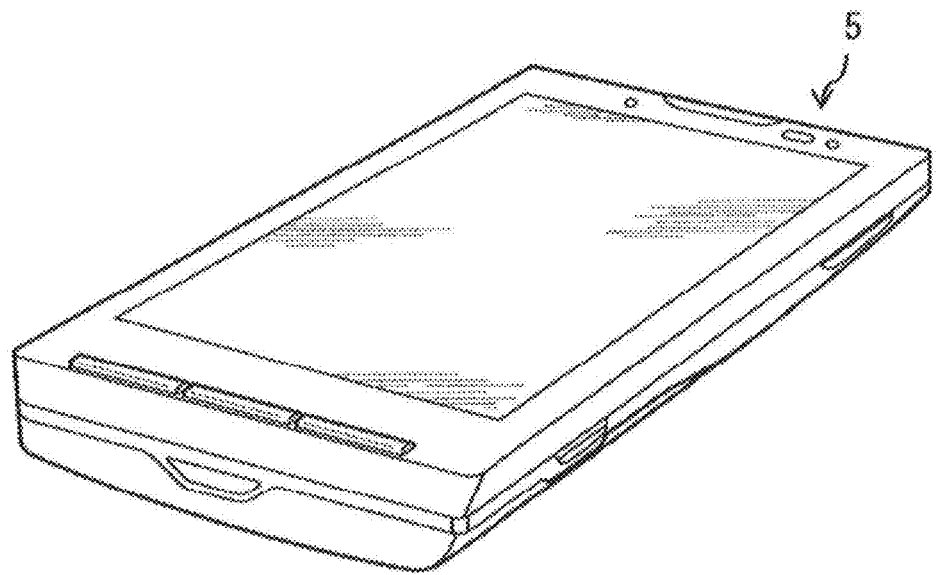

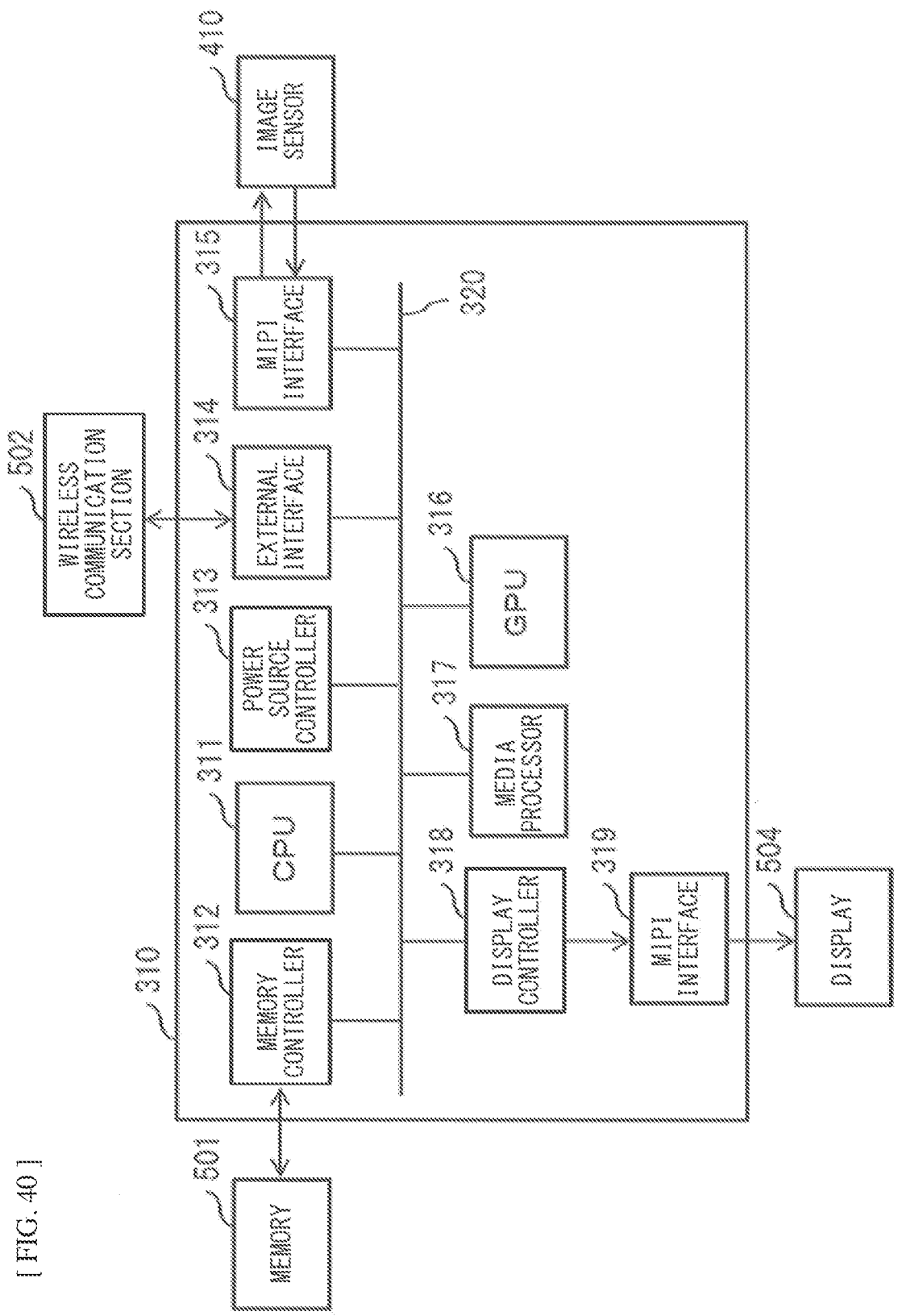
[FIG. 40]

[ FIG. 41 ]
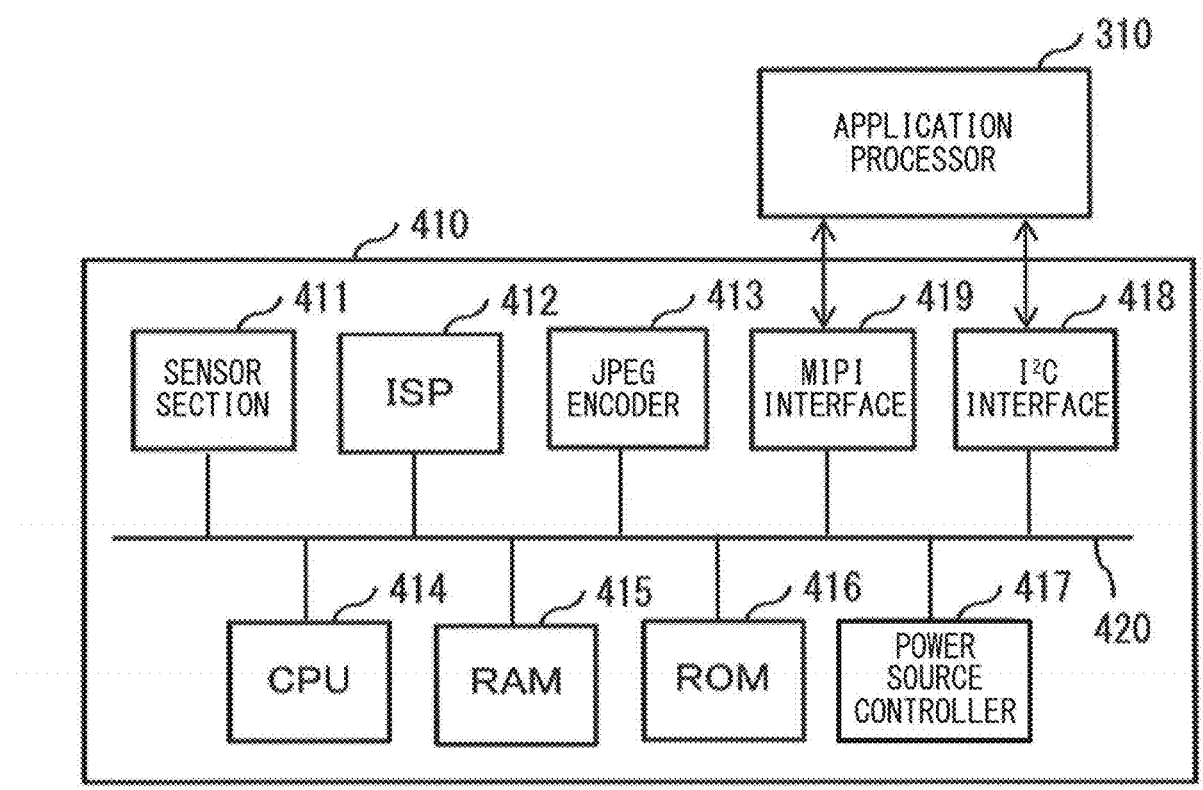

[FIG. 42]
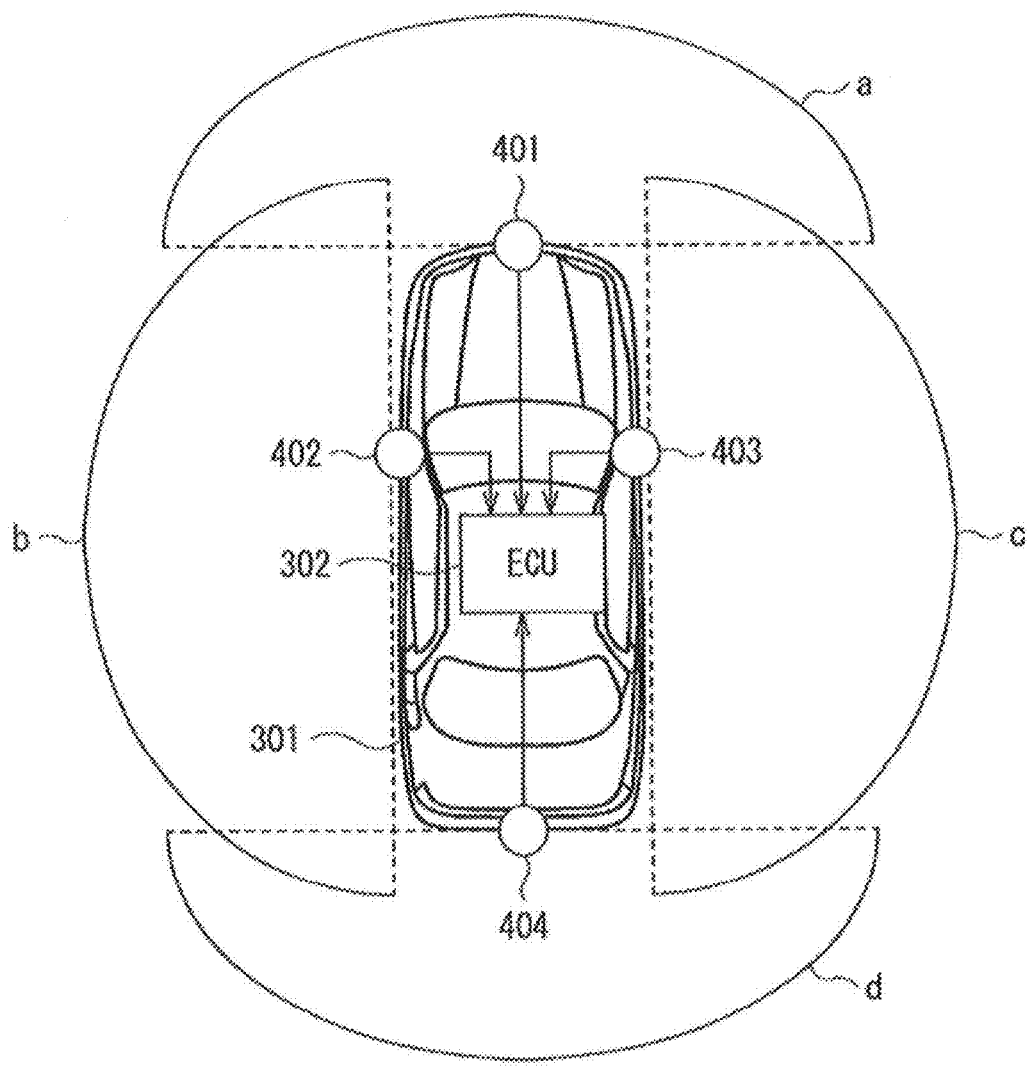
[FIG. 43]
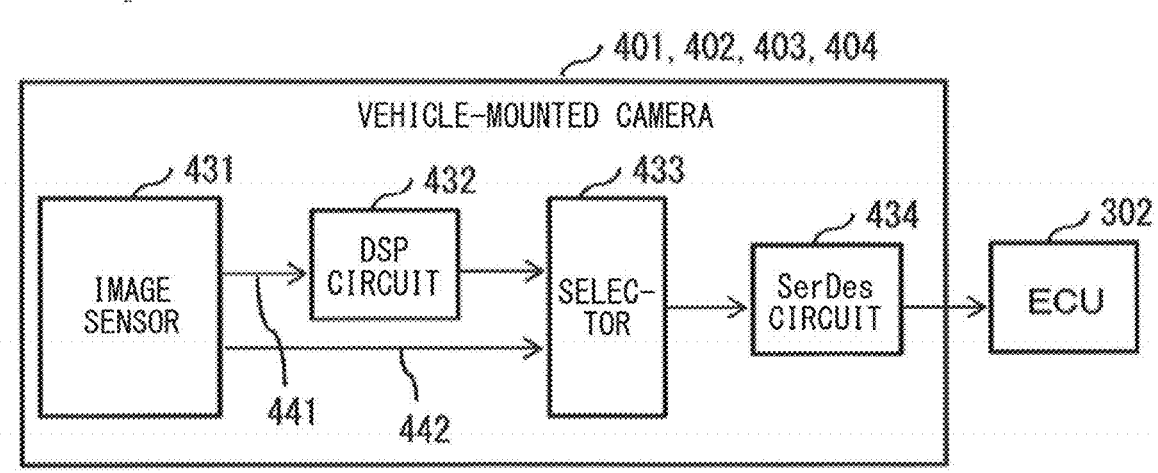

COMMUNICATION SYSTEM AND TRANSMITTER

TECHNICAL FIELD

The present disclosure relates to a communication system and a transmitter that are applied to transmission of a signal.

BACKGROUND ART

In recent years, drones, wearable devices, automobiles, and the like equipped with a plurality of cameras are rapidly increasing. High-speed interface specifications such as C-PHY specification and D-PHY specification that have been developed by the MIPI (Mobile Industry Processor Interface) alliance are applied in a case where image data from a plurality of cameras is transmitted to an application processor and the like. PTL 1 proposes a technology for signal transmission in the D-PHY specification.

CITATION LIST

Patent Literature

PTL 1: Japanese Unexamined Patent Application Publication No. 2017-195500

SUMMARY OF THE INVENTION

Incidentally, in the MIPI, data transmission is point-to-point transmission; therefore, for example, there are many issues to be solved to support a plurality of cameras, such as limitations on the number of pins on an application processor side, an increase in size of a transmission path, and product design. Multipoint bus transmission shows promise for support of a plurality of cameras. However, in existing multipoint bus transmission, waveform quality is greatly deteriorated by an influence of reflection and the like; therefore, the existing multipoint bus transmission is not suitable for high-speed transmission. It is therefore desirable to provide a communication system and a transmitter that make it possible to achieve multipoint bus transmission suitable for high-speed transmission.

A communication system according to an embodiment of the present disclosure is a communication system that transmits a signal from a plurality of transmission devices to one reception device via a transmission path. In the communication system, the transmission path includes a branch point at a midpoint, includes a plurality of first signal lines that couples the transmission devices and the branch point to each other, and further includes a second signal line that couples the branch point and the reception device to each other. Of the plurality of first signal lines or the second signal line, at least the plurality of first signal lines has a resistor element in proximity to the branch point.

A transmitter according to an embodiment of the present disclosure is a transmitter to be used for a communication system that transmits a signal from a plurality of transmission devices to one reception device. The transmitter includes: a branch point; a plurality of first signal lines that couples the transmission devices and the branch point to each other; a second signal line that couples the branch point and the reception device to each other; and a plurality of resistor elements provided in proximity to the branch point in at least the plurality of first signal lines of the plurality of first signal lines or the second signal line.

BRIEF DESCRIPTION OF DRAWING

FIG. 1 is a diagram illustrating an overview of a communication system according to a first embodiment of the present disclosure.

FIG. 2 is a diagram illustrating an example of a configuration of a transmission path in the communication system in FIG. 1.

FIG. 3 is a diagram illustrating an example of the configuration of the transmission path in the communication system in FIG. 1.

FIG. 4 is a diagram illustrating an example of the configuration of the transmission path in the communication system in FIG. 1.

FIG. 5 is a diagram illustrating an example of pass characteristics in the communication system in FIG. 1.

FIG. 6 is a diagram illustrating an example of reflection characteristics in the communication system in FIG. 1.

FIG. 7 is a diagram illustrating an example of an eye diagram in the communication system in FIG. 1.

FIG. 8 is a diagram illustrating an overview of a communication system according to a comparative example A.

FIG. 9 is a diagram illustrating an example of pass characteristics in the communication system in FIG. 8.

FIG. 10 is a diagram illustrating an example of reflection characteristics in the communication system in FIG. 8.

FIG. 11 is a diagram illustrating an example of an eye diagram in the communication system in FIG. 8.

FIG. 12 is a diagram illustrating an overview of a communication system according to a comparative example B.

FIG. 13 is a diagram illustrating an example of pass characteristics in the communication system in FIG. 12.

FIG. 14 is a diagram illustrating an example of reflection characteristics in the communication system in FIG. 12.

FIG. 15 is a diagram illustrating an example of an eye diagram in the communication system in FIG. 12.

FIG. 16 is a diagram illustrating an overview of a communication system according to a comparative example C.

FIG. 17 is a diagram illustrating an example of pass characteristics in the communication system in FIG. 16.

FIG. 18 is a diagram illustrating an example of reflection characteristics in the communication system in FIG. 16.

FIG. 19 is a diagram illustrating an example of an eye diagram in the communication system in FIG. 16.

FIG. 20 is a diagram illustrating an overview of a communication system according to a second embodiment of the present disclosure.

FIG. 21 is a diagram illustrating an example of a mounting form of a three-branched communication system.

FIG. 22 is a diagram illustrating an example of a mounting form of a four-branched communication system.

FIG. 23 is a diagram illustrating an example of a mounting form of a five-branched communication system.

FIG. 24 is a diagram illustrating a modification example of the communication system in FIG. 1.

FIG. 25 is a diagram illustrating an example of pass characteristics in the communication system in FIG. 24.

FIG. 26 is a diagram illustrating an example of reflection characteristics in the communication system in FIG. 24.

FIG. 27 is a diagram illustrating an example of an eye diagram in the communication system in FIG. 24.

FIG. 28 is a diagram illustrating an overview of a communication system according to a third embodiment of the present disclosure.

FIG. 29 is a diagram illustrating an example of the transmission path in the communication system in FIG. 1.

FIG. 30 is a diagram illustrating an example of a transmission path in the communication system in FIG. 20.

FIG. 31 is a diagram illustrating an example of a transmission path in the communication system in FIG. 21.

FIG. 32 is a diagram illustrating an example of a transmission path in the communication system in FIG. 24.

FIG. 33 is a diagram illustrating an example of a transmission path in the communication system in FIG. 28.

FIG. 34 is a diagram illustrating an example of the transmission path in the communication system in FIG. 29.

FIG. 35 is a diagram illustrating an example of the transmission path in the communication system in FIG. 30.

FIG. 36 is a diagram illustrating an example of the transmission path in the communication system in FIG. 31.

FIG. 37 is a diagram illustrating an example of the transmission path in the communication system in FIG. 32.

FIG. 38 is a diagram illustrating an example of the transmission path in the communication system in FIG. 33.

FIG. 39 is a perspective view of an appearance configuration of a smartphone to which the communication system according to any of the respective embodiments and modification examples thereof described above is applied.

FIG. 40 is a block diagram illustrating a configuration example of an application processor to which the communication system according to any of the respective embodiments and modification examples thereof described above is applied.

FIG. 41 is a block diagram illustrating a configuration example of an image sensor to which the communication system according to any of the respective embodiments and modification examples thereof described above is applied.

FIG. 42 is a diagram illustrating an installation example of a vehicle-mounted camera to which the communication system according to any of the respective embodiments and modification examples thereof described above is applied.

FIG. 43 is a diagram illustrating a configuration example in which the communication system according to any of the respective embodiments and modification examples thereof described above is applied to the vehicle-mounted camera.

MODES FOR CARRYING OUT THE INVENTION

Hereinafter, some embodiments of the present disclosure are described in detail with reference to the drawings. It should be noted that the description is given in the following order.
1. First Embodiment (communication system)
2. Second Embodiment (communication system)
3. Modification Example Common to First and Second Embodiments (communication system)
4. Third Embodiment (communication system)
5. Modification Example Common to First to Third Embodiments and Modification Examples Thereof (communication system)
6. Application Examples (smartphone, application processor, image sensor, and vehicle-mounted camera)

1. FIRST EMBODIMENT

Configuration

Description is given of a communication system 1 according to a first embodiment of the present disclosure. FIG. 1 illustrates an overview of the communication system 1. The communication system 1 is applied to multipoint bus transmission. The communication system 1 includes two transmission devices TX1 and TX2 and one reception device RX. The communication system 1 further includes a transmission path P that couples the respective transmission devices TX1 and TX2 and the reception device RX to each other, for example, as illustrated in FIGS. 1, 2, 3, and 4. The communication system 1 transmits signals from the two transmission devices TX1 and TX2 to the one reception device RX via the transmission path P.

The transmission path P is branched at a midpoint into three, and has branch points $H_p$ and $H_n$. A transmission path $P_1$ that is one of branches couples the transmission device TX1 and the branch points $H_p$ and $H_n$ to each other. The transmission path $P_1$ includes differential signal lines (a pair of signal lines $P_{1p}$ and Pin) that transmit a differential signal. The signal line $P_{1p}$ is coupled to the branch point $H_p$, and the signal line Pin is coupled to the branch point $H_n$. A terminator resistor $R_T/2$ of the transmission device TX1 is provided for each of the signal lines $P_{1p}$ and $P_{1n}$.

A transmission path $P_2$ that is one of the branches couples the transmission device TX2 and the branch points $H_p$ and $H_n$ to each other. The transmission path $P_2$ includes differential signal lines (a pair of signal lines $P_{2p}$ and Pen) that transmit a differential signal. The signal line $P_{2p}$ is coupled to the branch point $H_p$, and the signal line Pen is coupled to the branch point $H_n$. The terminator resistor $R_T/2$ of the transmission device TX2 is provided for each of the signal lines $P_{2p}$ and $P_{2n}$.

A transmission path $P_3$ that is one of the branches couples the reception device RX and the branch points $H_p$ and $H_n$ to each other. The transmission path $P_3$ includes differential signal lines (a pair of signal lines $P_{3p}$ and $P_{3n}$) that transmit a differential signal. The signal line $P_{3p}$ is coupled to the branch point $H_p$, and the signal line $P_{3n}$ is coupled to the branch point $H_n$. The terminator resistor $R_T/2$ of the reception device RX is provided for each of the signal lines $P_{3p}$ and $P_{3n}$. The signal lines $P_{1p}$, $P_{2p}$, and $P_{3p}$ are coupled to each other at the branch point $H_p$. The signal line $P_{1n}$, $P_{2n}$, and $P_{3n}$ are coupled to each other at the branch point $H_n$.

The transmission paths $P_1$, $P_2$, and $P_3$ are formed on a wiring substrate, for example. For example, as illustrated in FIGS. 2 and 3, the transmission paths $P_1$ and $P_3$ are formed in a common layer on the wiring substrate, and the transmission path $P_2$ is formed in a layer different from the transmission paths $P_1$ and $P_3$ on the wiring substrate. Further, for example, as illustrated in FIGS. 2 and 3, the transmission paths $P_1$ and $P_3$ and the transmission path $P_2$ are electrically coupled to each other via the branch points $H_p$ and $H_n$ that each include a through hole.

For example, as illustrated in FIG. 4, the transmission paths $P_2$ and $P_3$ may be formed in a common layer on the wiring substrate, and the transmission path $P_1$ may be formed in a layer different from the transmission paths $P_2$ and $P_3$ on the wiring substrate. Further, for example, as illustrated in FIG. 4, the transmission paths $P_2$ and $P_3$ and the transmission path $P_1$ may be electrically coupled to each other via the branch points $H_p$ and $H_n$ that each include a through hole.

Each of the signal lines $P_{1p}$, $P_{2p}$, and $P_{3p}$ includes a resistor element R in proximity to the branch point $H_p$. Further, each of the signal lines $P_{1n}$, $P_{2n}$, and $P_{3n}$ also includes the resistor element R in proximity to the branch point $H_n$. Here, the resistor element R has a resistance value represented by the following expression (1), where a characteristic impedance of each of the signal lines $P_{1p}$, $P_{1n}$, $P_{2p}$, $P_{2n}$, $P_{3p}$, and $P_{3n}$ is $Z_0$, each of the terminator resistors for the respective signal lines $P_{1p}$, $P_{1n}$, $P_{2p}$, and $P_{2n}$ of the respective transmission devices TX1 and TX2 is $R_T/2$, and each of the terminator resistors for the respective signal lines $P_{3p}$ and $P_{3n}$ of the reception device RX is $R_T/2$.

$$R=((\text{number of branches}-1)\times Z_0-R_T/2)/\text{number of branches} \quad (1)$$

In a case where the characteristic impedance $Z_0$ is 50 ohms and the terminator resistor $R_T/2$ has 100/2=50 ohms, the resistor element R has 16.7 ohms. At this time, each of the signal lines $P_{1p}$, $P_{1n}$, $P_{2p}$, $P_{2n}$, $P_{3p}$, and $P_{3n}$ has 50 ohms ($R_S$) as viewed from any port of the transmission devices TX1 and TX2 and the reception device RX, and is a transmission path achieving impedance matching.

To suppress deterioration in transmission characteristics by reflection, the respective resistor elements R are disposed as close to the branch points $H_p$ and $H_n$ as possible. In addition, to suppress deterioration in skew characteristics in a lane of the transmission path P, the signal lines $P_{1p}$ and $P_{1n}$ are disposed to lay wiring patterns of the signal line $P_{1p}$ and the signal line $P_{1n}$ in as approximate a layout as possible. Similarly, the signal lines $P_{2p}$ and $P_{2n}$ are disposed to lay wiring patterns of the signal line $P_{2p}$ and the signal line $P_{2n}$ in as approximate a layout as possible. Similarly, the signal lines $P_{3p}$ and $P_{3n}$ are disposed to lay wiring patterns of the signal line $P_{3p}$ and the signal line $P_{3n}$ in as approximate a layout as possible. In addition, to suppress deterioration in skew characteristic between lanes of the transmission path P, the respective signal lines $P_{1p}$, $P_{1n}$, $P_{2p}$, $P_{2n}$, $P_{3p}$, and $P_{3n}$ are disposed to lay wiring patterns of different lanes in as approximate a layout as possible.

To achieve suppression of deterioration in transmission characteristics by reflection, suppression of deterioration in skew characteristics in the lane of the transmission path P, and suppression of deterioration in skew characteristics between the lanes of the transmission path P, it is preferable to wire the transmission path P over a plurality of layers, as illustrated in FIGS. 2 to 4. At this time, the transmission path P is preferably configured to make characteristics of respective layers close to each other. In a case where the transmission path P is wired over a plurality of layers, if characteristics of the respective layers are not close to each other, use rates of the respective layers are preferably made uniform to less prone to cause a difference in characteristic of respective wiring lines included in one lane and a difference in characteristics between lanes.

In the communication system 1, in a case where the transmission device TX1 outputs a signal, for example, as illustrated in FIG. 1, output of the transmission device TX2 is stopped, and further, the transmission device TX2 is differentially terminated. Similarly, in the communication system 1, in a case where the transmission device TX2 outputs a signal, output of the transmission device TX1 is stopped, and further, the transmission device TX1 is differentially terminated. The transmission devices TX1 and TX2 are set to one of signal output and differential termination in accordance with a control signal from outside.

FIG. 5 illustrates an example of pass characteristics in the communication system 1. FIG. 6 illustrates an example of reflection characteristics in the communication system 1. FIG. 7 illustrates an example of an eye diagram in the communication system 1. In FIG. 5, a lower waveform of two waveforms is a result of pass characteristics as viewed from the transmission devices TX1 and TX2, and an upper waveform of the two waveforms is a result of pass characteristics as viewed from the reception device RX. In FIG. 6, a result of reflection characteristics as viewed from the transmission devices TX1 and TX2 and a result of reflection characteristics as viewed from the reception device RX are superimposed on each other.

In FIG. 5, a signal level around 1 GHz is −5 dB. This means that a level of a passing signal is decreased to about 56% by insertion of the resistor element R. In addition, in FIG. 6, a signal level around 1 GHz is −15 dB. This means that a level of a reflected signal is decreased to about 18%. In FIG. 7, an eye of the eye diagram is clearly open.

FIG. 8 illustrates an overview of a communication system 100 according to a comparative example A. FIG. 9 illustrates an example of pass characteristics in the communication system 100. FIG. 10 illustrates an example of reflection characteristics in the communication system 100. FIG. 11 illustrates an example of an eye diagram in the communication system 100. In the communication system 100, the terminator resistor $R_T/2$ of the transmission device TX1 is provided for each of the signal lines $P_{1p}$ and $P_{1n}$, and the terminator resistor $R_T/2$ of the reception device RX is provided for each of the signal lines $P_{3p}$ and $P_{3n}$. Further, the communication system 100 includes a transmission path using SSTL (Stub Series Termination Logic). Specifically, in the communication system 100, an SST having a resistance value of $Z_0/2$ is inserted in series in each of the signal lines $P_{2p}$ and $P_{2n}$ that are branched on a side where the transmission device TX2 serving as a stub is located. This eliminates impedance mismatching in a bus as viewed from the transmission device TX2.

In FIG. 9, a signal level around 1 GHz is about −2 dB. This is because the resistor element R as in the present embodiment is not inserted, and the signal level is not decreased much. However, in FIG. 10, a signal level around 1 GHz is about −7 dB. This means that a half of an inputted signal is returned by reflection. In addition, in FIG. 11, an eye of the eye diagram is extremely small, as compared with the eye of the eye diagram in FIG. 7. As can be seen from these factors, in the communication system 100, many noises are caused by reflection, and signals are difficult to pass.

FIG. 12 illustrates an overview of a communication system 200 according to a comparative example B. FIG. 13 illustrates an example of pass characteristics in the communication system 200. FIG. 14 illustrates an example of reflection characteristics in the communication system 200. FIG. 15 illustrates an example of an eye diagram in the communication system 200. In the communication system 200, the terminator resistor $R_T/2$ of the transmission device TX2 is provided for each of the signal lines $P_{2p}$ and $P_{2n}$, and the terminator resistor $R_T/2$ of the reception device RX is provided for each of the signal lines $P_{3p}$ and $P_{3n}$. Further, the communication system 200 includes a transmission path using SSTL. Specifically, in the communication system 200, an SST having a resistance value of $Z_0/2$ is inserted in series in each of the signal lines $P_{2p}$ and Pen that are branched on a side where the transmission device TX2 serving as a stub is located. This eliminates impedance mismatching in a bus as viewed from the transmission device TX2.

In FIG. 13, a signal level around 1 GHz is about −2 dB. This is because the resistor element R as in the present embodiment is not inserted, and the signal level is not decreased much. However, in FIG. 14, a signal level around 1 GHz is about −2 dB. This means that most of an inputted signal is returned by reflection. In addition, in FIG. 15, an eye of the eye diagram is hardly seen. As can be seen from these factors, in the communication system 200, many noises are caused by reflection, and signals are difficult to pass.

FIG. 16 illustrates an overview of the communication system 200 according to a comparative example C. FIG. 17 illustrates an example of pass characteristics in a communication system 300. FIG. 18 illustrates an example of reflection characteristics in the communication system 300. FIG. 19 illustrates an example of an eye diagram in the communication system 300. In the communication system 300, the terminator resistor $R_T/2$ of the transmission device TX1 is provided for each of the signal lines $P_{1p}$ and $P_{1n}$, and the terminator resistor $R_T/2$ of the transmission device TX2 is also provided for each of the signal lines $P_{2p}$ and $P_{2n}$. In the communication system 300, the terminator resistor $R_T/2$ of the reception device RX is also provided for each of the signal lines $P_{3p}$ and $P_{3n}$. Further, the communication system 300 includes a transmission path using SSTL. Specifically, in the communication system 300, an SST having a resistance value of $Z_0/2$ is inserted in series in each of the signal lines $P_{2p}$ and $P_{2n}$ that are branched on a side where the transmission device TX2 serving as a stub is located. This eliminates impedance mismatching in a bus as viewed from the transmission device TX2.

In FIG. 17, a signal level around 1 GHz is about −4 dB. This is because the resistor element R as in the present embodiment is not inserted, and the signal level is not decreased much. However, in FIG. 18, a signal level around 1 GHz is about −6 dB. This means that about a half of an inputted signal is returned by reflection. In addition, in FIG. 19, an eye of the eye diagram is seen to some extent. As can be seen from these factors, in the communication system 300, many noises are caused by reflection, and signals are difficult to pass.

Effects

Next, description is given of effects of the communication system 1 according to the present embodiment.

In recent years, drones, wearable devices, automobiles, and the like equipped with a plurality of cameras are rapidly increasing. High-speed interface specifications such as C-PHY specification and D-PHY specification that have been developed by the MIPI alliance are applied in a case where image data from a plurality of cameras is transmitted to an application processor and the like.

Incidentally, in the MIPI, data transmission is point-to-point transmission; therefore, for example, there are many issues to be solved to support a plurality of cameras, such as limitations on the number of pins on an application processor side, an increase in size of a transmission path, and product design. Multipoint bus transmission shows promise for support of a plurality of cameras. However, in existing multipoint bus transmission, waveform quality is greatly deteriorated by an influence of reflection and the like; therefore, the existing multipoint bus transmission is not suitable for high-speed transmission. Actually, in the communication systems 100, 200, and 300 described above, many noises are caused by reflection, and signals are difficult to pass.

In contrast, in the present embodiment, the three-branched branch points $H_p$ and tin are provided in the transmission path P, and the resistor element R is provided for each of signal lines at the three-branched branch points $H_p$ and $H_n$. Thus, in the present embodiment, only providing branches to the transmission path P by an extremely simple configuration makes it possible to achieve multipoint bus transmission suitable for high-speed transmission.

In addition, in the present embodiment, each of the resistor elements R provided in the transmission path P has a resistance value represented by the expression (1) described above. Accordingly, each of the signal lines $P_{1p}$, $P_{1n}$, $P_{2p}$, $P_{2n}$, $P_{3p}$, and $P_{3n}$ has 50 ohms ($R_S$) as viewed from any port of the transmission devices TX1 and TX2 and the reception device RX, and is a transmission path achieving impedance matching. This makes it possible to achieve multipoint bus transmission suitable for high-speed transmission.

In addition, in the present embodiment, a transmission device (e.g., the transmission device TX2) that does not output a signal is differentially terminated. This makes it possible to reduce noise in the transmission path P, as compared with a case where the transmission device that does not output a signal becomes a released end. This makes it possible to achieve multipoint bus transmission suitable for high-speed transmission.

2. SECOND EMBODIMENT

Configuration

Description is given of a communication system 2 according to a second embodiment of the present disclosure. FIG. 20 illustrates an overview of the communication system 2. The communication system 2 is applied to multipoint bus transmission. The communication system 2 includes three transmission devices TX1, TX2, and TX3, and one reception device RX. The communication system 2 further includes, for example, the transmission path P that couples the respective transmission devices TX1, TX2, and TX3 and the reception device RX to each other, for example, as illustrated in FIG. 20. The communication system 2 transmits signals from the three transmission devices TX1, TX2, and TX3 to the one reception device RX via the transmission path P.

The transmission path P is branched at a midpoint into four, and has the branch points $H_p$ and $H_n$. The transmission path $P_1$ that is one of branches couples the transmission device TX1 and the branch points $H_p$ and $H_n$ to each other. The transmission path $P_1$ includes differential signal lines (a pair of signal lines $P_{1p}$ and $P_{1n}$) that transmit a differential signal. The signal line $P_{1p}$ is coupled to the branch point $H_p$, and the signal line $P_{1n}$ is coupled to the branch point $H_n$. The terminator resistor $R_T/2$ of the transmission device TX1 is provided for each of the signal lines $P_{1p}$ and $P_{1n}$.

The transmission path $P_2$ that is one of the branches couples the transmission device TX2 and the branch points $H_p$ and $H_n$ to each other. The transmission path $P_2$ includes differential signal lines (a pair of signal lines $P_{2p}$ and $P_{2n}$) that transmit a differential signal. The signal line $P_{2p}$ is coupled to the branch point $H_p$, and the signal line $P_{2n}$ is coupled to the branch point $H_n$. The terminator resistor $R_T/2$ of the transmission device TX2 is provided for each of the signal lines $P_{2p}$ and $P_{2n}$.

The transmission path $P_3$ that is one of the branches couples the reception device RX and the branch points $H_p$ and $H_n$ to each other. The transmission path $P_3$ includes differential signal lines (a pair of signal lines $P_{3p}$ and $P_{3n}$) that transmit a differential signal. The signal line $P_{3p}$ is coupled to the branch point $H_p$, and the signal line $P_{3n}$ is coupled to the branch point $H_n$. The terminator resistor $R_T/2$ of the reception device RX is provided for each of the signal lines $P_{3p}$ and $P_{3n}$.

A transmission path $P_4$ that is one of the branches couples the transmission device TX3 and the branch points $H_p$ and $H_n$ to each other. The transmission path $P_4$ includes differential signal lines (a pair of signal lines $P_{4p}$ and $P_{4n}$) that transmit a differential signal. The signal line $P_{4p}$ is coupled to the branch point $H_p$, and the signal line $P_{4n}$ is coupled to the branch point $H_n$. The terminator resistor $R_T/2$ of the transmission device TX3 is provided for each of the signal lines $P_{4p}$ and $P_{4n}$. The signal lines $P_{1p}$, $P_{2p}$, $P_{3p}$, and $P_{4p}$ are coupled to each other at the branch point $H_p$. The signal lines $P_{1n}$, $P_{2n}$, $P_{3n}$, and $P_{4n}$ are coupled to each other at the branch point $H_n$.

Each of the signal lines $P_{1p}$, $P_{2p}$, $P_{3p}$, and $P_{4p}$ includes the resistor element R in proximity to the branch point $H_p$. Further, each of the signal lines $P_{1n}$, $P_{2n}$, $P_{3n}$, and $P_{4n}$ also includes the resistor element R in proximity to the branch point $H_n$. Here, the resistor element R has a resistance value represented by the expression (1) described above, where a characteristic impedance of each of the signal lines $P_{1p}$, $P_{1n}$, $P_{2p}$, $P_{2n}$, $P_{3p}$, $P_{3n}$, $P_{4p}$, and $P_{4n}$ is $Z_0$, a terminator resistor for each of the signal lines $P_{1p}$, $P_{1n}$, $P_{2p}$, $P_{2n}$, $P_{4p}$, and $P_{4n}$ of the respective transmission devices TX1, TX2, and TX3 is $R_T/2$, a terminator resistor for each of the signal lines $P_{3p}$ and $P_{3n}$ of the reception device RX is $R_T/2$.

In a case where the characteristic impedance $Z_0$ is 50 ohms and the terminator resistor $R_T/2$ has 100/2=50 ohms, the resistor element R has 25 ohms. At this time, each of the signal lines $P_{1p}$, $P_{1n}$, $P_{2p}$, $P_{2n}$, $P_{3p}$, $P_{3n}$, $P_{4p}$, and $P_{4n}$ has 50 ohms ($R_S$) as viewed from any port of the transmission devices TX1, TX2, and TX3 and the reception device RX, and is a transmission path achieving impedance matching.

To suppress deterioration in transmission characteristics by reflection, the respective resistor elements R are disposed as close to the branch points $H_p$ and $H_n$ as possible. In addition, to suppress deterioration in skew characteristics in a lane of the transmission path P, the signal lines $P_{1p}$ and $P_{1n}$ are disposed to lay wiring patterns of the signal line $P_{1p}$ and the signal line $P_{1n}$ in as approximate a layout as possible. Similarly, the signal lines $P_{2p}$ and Pen are disposed to lay wiring patterns of the signal line $P_{2p}$ and the signal line $P_{2n}$ in as approximate a layout as possible. Similarly, the signal lines $P_{3p}$ and $P_{3n}$ are disposed to lay wiring patterns of the signal line $P_{3p}$ and the signal line $P_{3n}$ in as approximate a layout as possible. Similarly, the signal lines $P_{4p}$ and $P_{4n}$ are disposed to lay wiring patterns of the signal line $P_{4p}$ and the signal line $P_{4n}$ in as approximate a layout as possible. In addition, to suppress deterioration in skew characteristic between lanes of the transmission path P, the respective signal lines $P_{1p}$, $P_{1n}$, $P_{2p}$, $P_{2n}$, $P_{3p}$, $P_{3n}$, $P_{4p}$, and $P_{4n}$ are disposed to lay wiring patterns of different lanes in as approximate a layout as possible.

In the communication system 2, in a case where the transmission device TX1 outputs a signal, for example, as illustrated in FIG. 20, output of the transmission devices TX2 and TX3 is stopped, and further, the transmission devices TX2 and TX3 are differentially terminated. Similarly, in the communication system 2, in a case where the transmission device TX2 outputs a signal, output of the transmission devices TX1 and TX3 is stopped, and further, the transmission devices TX1 and TX3 are differentially terminated. Similarly, in the communication system 2, in a case where the transmission device TX3 outputs a signal, output of the transmission devices TX1 and TX2 is stopped, and further, the transmission devices TX1 and TX2 are differentially terminated. The transmission devices TX1, TX2, and TX3 are set to one of signal output and differential termination in accordance with a control signal from outside.

Effects

Next, description is given of effects of the communication system 2 according to the present embodiment.

In the present embodiment, one set of the four-branched branch points $H_p$ and $H_n$ is provided in the transmission path P, and the resistor element R is provided for each of signal lines at each set of the four-branched branch points $H_p$ and $H_n$. Thus, in the present embodiment, only providing branches to the transmission path P by an extremely simple configuration makes it possible to achieve multipoint bus transmission suitable for high-speed transmission.

In addition, in the present embodiment, each of the resistor elements R provided in the transmission path P has a resistance value represented by the expression (1) described above. Accordingly, each of the signal lines $P_{1p}$, $P_{1n}$, $P_{2p}$, $P_{2n}$, $P_{3p}$, $P_{3n}$, $P_{4p}$, and $P_{4n}$ has 50 ohms ($R_S$) as viewed from any port of the transmission devices TX1, TX2, and TX3 and the reception device RX, and is a transmission path achieving impedance matching. This makes it possible to achieve multipoint bus transmission suitable for high-speed transmission.

In addition, in the present embodiment, a transmission device (e.g., the transmission devices TX2 and TX3) that does not output a signal is differentially terminated. This makes it possible to reduce noise in the transmission path P, as compared with a case where the transmission device that does not output a signal becomes a released end. This makes it possible to achieve multipoint bus transmission suitable for high-speed transmission.

3. MODIFICATION EXAMPLE COMMON TO FIRST AND SECOND EMBODIMENTS

Modification Example A

FIG. 21 illustrates an example of a mounting form of the three-branched communication system 1. The communication system 1 according to the present modification example transmits signals from the two transmission devices TX1 and TX2 to the one reception device RX via the transmission path P. The respective resistor elements R are disposed in proximity to the branch points $H_p$ and $H_n$. Further, the signal line $P_{1p}$ and the signal line $P_{2p}$ are coupled to each other at the branch point $H_p$. Similarly, the signal line $P_{1n}$ and the signal line Pen are coupled to each other at the branch point $H_n$. Further, the signal line $P_{1p}$ and the signal line $P_{3p}$ are disposed in a common transmission path at the branch point $H_p$. Similarly, the signal line $P_{1n}$ and the signal line $P_{3n}$ are disposed in a common transmission path at the branch point $H_p$.

In the communication system 1 according to the present modification example, in a case where the transmission device TX1 outputs a signal, output of the transmission device TX2 is stopped, and further, the transmission device TX2 is differentially terminated. Similarly, in the communication system 1 according to the present modification example, in a case where the transmission device TX2 outputs a signal, output of the transmission device TX1 is stopped, and further, the transmission device TX1 is differentially terminated.

In the present modification example, one set of the three-branched branch points $H_p$ and $H_n$ is provided in the transmission path P, and the resistor element R is provided for each of signal lines at each set of the three-branched branch points $H_p$ and $H_n$. Thus, in the present modification example, only providing branches to the transmission path P by an extremely simple configuration makes it possible to achieve multipoint bus transmission suitable for high-speed transmission.

Modification Example B

FIG. 22 illustrates an example of a mounting form of the four-branched communication system 2. The communication system 2 according to the present modification example transmits signals from the three transmission devices TX1, TX2, and TX3 to the one reception device RX via the transmission path P. In FIG. 22, the three-branched branch points $H_p$ and $H_n$ are provided in two spots (a spot A and a spot B) of the transmission path P, and the resistor element R is provided for each of signal lines in each of the spots A and B. At this time, each of the resistor elements R has a resistance value in a case where the number of branches is three in the expression (1).

The signal line $P_{1p}$ and the signal line $P_{2p}$ are coupled to each other at the branch point $H_p$ in the spot A. Similarly, the signal line $P_{1n}$ and signal line $P_{2n}$ are coupled to each other at the branch point $H_n$ in the spot A. Further, the signal line $P_{1p}$ and a signal line $P_{5p}$ are disposed in a common transmission path at the branch point $H_p$ in the spot A. Similarly, the signal line $P_{1n}$ and a signal line $P_{5n}$ are disposed in a common transmission path at the branch point $H_n$ in the spot A. It should be noted that the signal line $P_{5p}$ is a wiring line that electrically couples the signal line $P_{1p}$ in the spot A and the signal line $P_{3p}$ in the spot B to each other. The signal line $P_{5n}$ is a wiring line that electrically couples the signal line $P_{1n}$ in the spot A and the signal line $P_{3n}$ in the spot B to each other.

The signal line $P_{3p}$ and the signal line $P_{4p}$ are coupled to each other at the branch point $H_p$ in the spot B. Similarly, the signal line $P_{3n}$ and signal line $P_{4n}$ are coupled to each other at the branch point $H_n$ in the spot B. Further, the signal line $P_{3p}$ and the signal line $P_{5p}$ are disposed in a common transmission path at the branch point $H_p$ in the spot B. Similarly, the signal line $P_{3n}$ and the signal line $P_{5n}$ are disposed in a common transmission path at the branch point $H_n$ in the spot B.

In the communication system 2 according to the present modification example, in a case where the transmission device TX1 outputs a signal, output of the transmission devices TX2 and TX3 is stopped, and further, the transmission devices TX2 and TX3 are differentially terminated. Similarly, in the communication system 2 according to the present modification example, in a case where the transmission device TX2 outputs a signal, output of the transmission devices TX1 and TX3 is stopped, and further, the transmission devices TX1 and TX3 are differentially terminated. Similarly, in the communication system 2 according to the present modification example, in a case where the transmission device TX3 outputs a signal, output of the transmission devices TX1 and TX2 is stopped, and further, the transmission devices TX1 and TX2 are differentially terminated.

In the present modification example, two sets of the three-branched branch points $H_p$ and $H_n$ are provided in the transmission path P, and the resistor element R is provided for each of signal lines at each set of the three-branched branch points $H_p$ and $H_n$. Thus, in the present modification example, only providing branches to the transmission path P by an extremely simple configuration makes it possible to achieve multipoint bus transmission suitable for high-speed transmission.

Modification Example C

FIG. 23 illustrates an example of a mounting form of a five-branched communication system 3. The communication system 3 according to the present modification example transmits signals from the four transmission devices TX1, TX2, TX3, and TX4 to the one reception device RX via the transmission path P. FIG. 23 corresponds to the four-branched communication system 2 in FIG. 22 that is newly provided with three branches in each of the signal line $P_{3p}$ and the signal line $P_{4p}$. It should be noted that a spot where three branches are newly provided is referred to as "spot C". In each of the spots A, B, and C, the resistor element FR is provided for each of signals lines. At this time, each of the resistor elements R has a resistance value (16.7 ohms) in a case where the number of branches is three in the expression (1).

The signal line $P_{4p}$ and a signal line $P_{6p}$ are coupled to each other at the branch point $H_p$ in the spot C. Similarly, the signal line $P_{4n}$ and a signal line $P_{6n}$ are coupled to each other at the branch point $H_n$ in the spot C. It should be noted that the signal line $P_{6p}$ is one wiring line coupled to the transmission device TX4. The signal line $P_{6n}$ is another wiring line coupled to the transmission device TX4. Further, the signal line $P_{4p}$ and a signal line $P_{1p}$ are disposed in a common transmission path at the branch point $H_p$ in the spot C. Similarly, the signal line $P_{4n}$ and a signal line $P_{1n}$ are disposed in a common transmission path at the branch point $H_n$ in the spot C. It should be noted that the signal line $P_{7p}$ is one wiring line coupled to the transmission device TX3. The signal line $P_{7n}$ is another wiring line coupled to the transmission device TX3.

In the communication system 3 according to the present modification example, in a case where the transmission device TX1 outputs a signal, output of the transmission devices TX2, X3, and X4 is stopped, and further, the transmission devices TX2, X3, and X4 are differentially terminated. Similarly, in the communication system 3 according to the present modification example, in a case where the transmission device TX2 outputs a signal, output of the transmission devices TX1, X3 and X4 is stopped, and further, the transmission devices TX1, X3, and X4 are differentially terminated. Similarly, in the communication system 3 according to the present modification example, in a case where the transmission device TX3 outputs a signal, output of the transmission devices TX1, X2 and X4 is stopped, and further, the transmission devices TX1, X2, and X4 are differentially terminated. Similarly, in the communication system 3 according to the present modification example, in a case where the transmission device TX4 outputs a signal, output of the transmission devices TX1, X2 and X3 is stopped, and further, the transmission devices TX1, X2, and X3 are differentially terminated. The transmission devices TX1, TX2, TX3, and TX4 are set to one of signal output and differential termination in accordance with a control signal from outside.

In the present modification example, two sets of the three-branched branch points $H_p$ and $H_n$ are provided in the transmission path P, and further, one set of the three-branched branch points $H_p$ and $H_n$ is provided in a pair of signal lines branched at one of the sets of the branch points $H_p$ and $H_n$ from a main transmission path that couples the transmission device TX1 and the reception device RX to each other. The resistor element R is provided for each of signal lines at each set of the three-branched branch points $H_p$ and $H_n$. Thus, in the present modification example, only providing branches to the transmission path P by an extremely simple configuration makes it possible to achieve multipoint bus transmission suitable for high-speed transmission.

Modification Example D

In the respective embodiments and the modification examples thereof described above, the respective resistor elements R provided close to the reception device RX at the respective branch points $H_p$ and $H_n$ may be omitted. FIG. 24 illustrates a modification example of the communication system 1. The communication system 1 illustrated in FIG. 24 corresponds to the communication system 1 according to the embodiment described above from which the respective resistor elements R provided close to the reception device RX at the branch points $H_p$ and $H_n$ are omitted. In the communication system 1 illustrated in FIG. 24, each of the resistor elements R has a resistance value obtained by solving the following expression (2).

[Math. 1]

$$R^2 + \left(\frac{3}{2}R_T - Z_0\right)R + \frac{R_T}{2}\left(\frac{R_T}{2} - 2Z_0\right) = 0 \quad (2)$$

In a case where the characteristic impedance $Z_0$ is 50 ohms and the terminator resistor $R_T/2$ has 100/2=50 ohms, the resistor element R has 20.7 ohms. At this time, each of the signal lines $P_{1p}$, $P_{1n}$, $P_{2p}$, $P_{2n}$, $P_{3p}$, and $P_{3n}$ has 50 ohms ($R_{S-fromTX}$) as viewed from any port of the transmission devices TX1 and TX2, and has 35.35 ohms ($R_{S-fromRX}$) as viewed from a port of the reception device RX.

FIG. 25 illustrates an example of pass characteristics in the communication system 1 illustrated in FIG. 24. FIG. 26 illustrates an example of reflection characteristics in the communication system 1 illustrated in FIG. 24. FIG. 27 illustrates an example of an eye diagram in the communication system 1 illustrated in FIG. 24. In FIG. 25, a lower waveform of two waveforms is a result of pass characteristics as viewed from the transmission devices TX1 and TX2, and an upper waveform of the two waveforms is a result of pass characteristics as viewed from the reception device RX. In FIG. 26, a result of reflection characteristics as viewed from the transmission devices TX1 and TX2 and a result of reflection characteristics as viewed from the reception device RX are not superimposed on each other, and the reflection characteristics as viewed from the transmission devices TX1 and TX2 is superior to the reflection characteristics as viewed from the reception device RX.

In FIG. 25, a signal level around 1 GHz is −3 dB, which is slightly improved, as compared with the signal level in FIG. 5. This is because the respective resistor elements R provided close to the reception device RX at the branch points $H_p$ and $H_n$ are omitted, which prevents voltage division by the respective resistor elements R provided close to the reception device RX. In addition, in FIG. 26, in the reflection characteristics as viewed from the transmission devices TX1 and TX2, a signal level around 1 GHz is −18 dB, and in the reflection characteristics as viewed from the reception device RX, a signal level around 1 GHz is −10 dB. In FIG. 27, an eye of the eye diagram is clearly open.

In the present modification example, omitting the respective resistor elements R provided close to the reception device RX at the branch points $H_p$ and $H_n$ makes it possible to improve a signal level inputted to the reception device RX. Accordingly, the present modification example is resistant to noise by an improved amount of the signal level, which makes it possible to achieve multipoint bus transmission suitable for high-speed transmission.

4. THIRD EMBODIMENT

Configuration

Description is given of a communication system 4 according to a third embodiment of the present disclosure. FIG. 28 illustrates an overview of the communication system 4. The communication system 4 is applied to multipoint bus transmission. The communication system 4 includes two transmission devices TX1 and TX2 and one reception device RX. The communication system 4 further includes the transmission path P that couples the respective transmission devices TX1 and TX2 and the reception device RX to each other, for example, as illustrated in FIG. 28. The communication system 4 transmits signals from the two transmission devices TX1 and TX2 to the one reception device RX via the transmission path P.

The transmission path P is branched at a midpoint into three, and has branch points $H_1$, $H_2$, and $H_3$. The transmission path $P_1$ that is one of branches couples the transmission device TX1 and the branch points $H_1$, $H_2$, and $H_3$ to each other. The transmission path $P_1$ includes three signal lines $P_{11}$, $P_{12}$, and $P_{13}$ that transmit a set of three signals. The signal line $P_{11}$ is coupled to the branch point $H_1$. The signal line $P_{12}$ is coupled to the branch point $H_2$. The signal line $P_{13}$ is coupled to the branch point $H_3$.

The transmission path $P_2$ that is one of the branches couples the transmission device TX2 and the branch points $H_1$, $H_2$, and $H_3$ to each other. The transmission path $P_2$ includes three signal lines $P_{21}$, $P_{22}$, and $P_{23}$ that transmit a set of three signals. The signal line $P_{21}$ is coupled to the branch point $H_1$. The signal line $P_{22}$ is coupled to the branch point $H_2$. The signal line $P_{23}$ is coupled to the branch point $H_3$. The transmission path $P_3$ that is one of the branches couples the transmission device TX3 and the branch points $H_1$, $H_2$, and $H_3$ to each other. The transmission path $P_3$ includes three signal lines $P_{31}$, $P_{32}$, and $P_{33}$ that transmit a set of three signals. The signal line $P_{31}$ is coupled to the branch point $H_1$. The signal line $P_{32}$ is coupled to the branch point $H_2$. The signal line $P_{33}$ is coupled to the branch point $H_3$.

Each of the signal lines $P_{11}$, $P_{21}$, and $P_{31}$ includes the resistor element R in proximity to the branch point $H_1$. Each of the signal lines $P_{12}$, $P_{22}$, and $P_{32}$ includes the resistor element R in proximity to the branch point $H_2$. Each of the signal lines $P_{13}$, $P_{23}$, and $P_{33}$ includes the resistor element R in proximity to the branch point $H_3$ Here, the resistor element R has a resistance value represented by the expression (1) described above, where a characteristic impedance of each of the signal lines $P_{11}$, $P_{21}$, $P_{31}$, $P_{12}$, $P_{22}$, $P_{32}$, $P_{13}$, $P_{23}$, and $P_{33}$ is $Z_0$, a terminator resistor for each of the signal lines $P_{11}$, $P_{21}$, $P_{12}$, $P_{22}$, $P_{13}$, and $P_{23}$ of the respective transmission devices TX1 and TX2 is $R_T/2$, a terminator resistor for each of the signal lines $P_{31}$, $P_{32}$, and $P_{33}$ of the reception device RX is $R_T/2$.

In a case where the characteristic impedance $Z_0$ is 50 ohms and the terminator resistor $R_T/2$ has 100/2=50 ohms, the resistor element R has 16.7 ohms. At this time, each of the signal lines $P_{11}$, $P_{21}$, $P_{31}$, $P_{12}$, $P_{22}$, $P_{32}$, $P_{13}$, $P_{23}$, and $P_{33}$ has 50 ohms ($R_S$) as viewed from any port of the transmission devices TX1 and TX2 and the reception device RX, and is a transmission path achieving impedance matching.

In the communication system 4, in a case where the transmission device TX1 outputs a signal, output of the transmission device TX2 is stopped, and further, the transmission device TX2 is differentially terminated. Similarly, in the communication system 4, in a case where the transmission device TX2 outputs a signal, output of the transmission device TX1 is stopped, and further, the transmission device TX1 is differentially terminated. The transmission devices TX1 and TX2 are set to one of signal output and differential termination in accordance with a control signal from outside.

In the present embodiment, the three-branched branch points $H_1$, $H_2$, and $H_3$ are provided in the transmission path P, and the resistor element R is provided for each of signal lines at the three-branched branch points $H_1$, $H_2$, and $H_3$. Thus, in the present embodiment, only providing branches to the transmission path P by an extremely simple configuration makes it possible to achieve multipoint bus transmission suitable for high-speed transmission.

In addition, in the present embodiment, each of the resistor elements R provided in the transmission path P has a resistance value represented by the expression (1) described above. Accordingly, each of the signal lines $P_{11}$, $P_{21}$, $P_{31}$, $P_{12}$, $P_{22}$, $P_{32}$, $P_{13}$, $P_{23}$, and $P_{33}$ has 50 ohms ($R_S$) as viewed from any port of the transmission devices TX1 and TX2 and the reception device RX, and is a transmission path achieving impedance matching. This makes it possible to achieve multipoint bus transmission suitable for high-speed transmission.

In addition, in the present embodiment, a transmission device (e.g., the transmission device TX2) that does not output a signal is differentially terminated. This makes it possible to reduce noise in the transmission path P, as compared with a case where the transmission device that does not output a signal becomes a released end. This makes it possible to achieve multipoint bus transmission suitable for high-speed transmission.

5. MODIFICATION EXAMPLE COMMON TO FIRST TO THIRD EMBODIMENTS AND MODIFICATION EXAMPLES THEREOF

In the transmission path P according to a modification example common to the first to third embodiments and the modification examples thereof, a portion including the branch points $H_p$ and $H_n$ or the branch points $H_1$, $H_2$, and $H_3$, and the respective element resistors R may include a transmitter such as an IC (Integrated Circuit) and a module.

In the communication system 1 in FIG. 1, the transmission path P may include a transmitter 10, for example, as illustrated in FIG. 29. The transmitter 10 includes, for example, the branch points $H_p$ and $H_n$, and six resistor elements provided in proximity to the branch points $H_p$ and $H_n$ in the respective signal lines $P_{1p}$, $P_{1n}$, $P_{2p}$, $P_{2n}$, $P_{3p}$, and $P_{3n}$. The transmitter 10 further includes, for example, six coupling terminals $T_{1p}$, $T_{1n}$, $T_{2p}$, $T_{2n}$, $T_{3p}$, and $T_{3n}$ coupled to ends on a side opposite to the branch points $H_p$ and $H_n$ of the respective signal line $P_{1p}$, $P_{1n}$, $P_{2p}$, $P_{2n}$, $P_{3p}$, and $P_{3n}$.

In the communication system 2 in FIG. 20, the transmission path P may include a transmitter 20, for example, as illustrated in FIG. 30. The transmitter 20 includes, for example, the branch points $H_p$ and $H_n$, and eight resistor elements provided in proximity to the branch points $H_p$ and $H_n$ in the respective signal lines $P_{1p}$, $P_{1n}$, $P_{2p}$, $P_{2n}$, $P_{3p}$, $P_{3n}$, $P_{4p}$, and $P_{4n}$. The transmitter 20 further includes, for example, eight coupling terminals $T_{1p}$, $T_{1n}$, $T_{2p}$, $T_{2n}$, $T_{3p}$, $T_{3n}$, $T_{4p}$, and $T_{4n}$ coupled to ends on a side opposite to the branch points $H_p$ and $H_n$ of the respective signal line $P_{1p}$, $P_{1n}$, $P_{2p}$, $P_{2n}$, $P_{3p}$, $P_{3n}$, $R_{4p}$, and $P_{4n}$.

The communication system 1 in FIG. 21 may include a transmitter 30, for example, as illustrated in FIG. 31. The transmitter 30 includes, for example, the branch points $H_p$ and $H_n$, and six resistor elements provided in proximity to the branch points $H_p$ and $H_n$ in the respective signal lines $P_{1p}$, $P_{1n}$, $P_{2p}$, $P_{2n}$, $P_{3p}$, and $P_{3n}$. The transmitter 30 further includes, for example, six coupling terminals $T_{1p}$, $T_{1n}$, $T_{2p}$, $T_{2n}$, $T_{3p}$, and Tan coupled to ends on a side opposite to the branch points $H_p$ and $H_n$ in the respective signal line $P_{1p}$, $P_{1n}$, $P_{2p}$, $P_{2n}$, $P_{3p}$, and $P_{3n}$.

In the communication system 2 in FIG. 22, each of the A spot and the B spot of the transmission path P may include the transmitter 30, for example, as illustrated in FIG. 31. In addition, in the communication system 3 in FIG. 23, each of the A spot, the B spot, and the C spot of the transmission path P may include the transmitter 30, for example, as illustrated in FIG. 31.

In the communication system 1 in FIG. 24, the transmission path P may include a transmitter 40, for example, as illustrated in FIG. 32. The transmitter 40 includes, for example, the branch points $H_p$ and $H_n$, and four resistor elements R provided in proximity to the branch points $H_p$ and $H_n$ in the respective signal lines $P_{1p}$, $P_{1n}$, $P_{2p}$, and Pen. The transmitter 10 further includes, for example, six coupling terminals $T_{1p}$, $T_{1n}$, $T_{2p}$, $T_{3n}$, $T_{3p}$, and Tan coupled to ends on a side opposite to the branch points $H_p$ and $H_n$ of the respective signal line $P_{1p}$, $P_{1n}$, $P_{2p}$, $P_{2n}$, $P_{3p}$, and $P_{3n}$. In the transmitter 40, the element resistor R is not provided for each of the signal lines $P_{3p}$ and $P_{3n}$.

In the communication system 4 in FIG. 28, the transmission path P may include a transmitter 50, for example, as illustrated in FIG. 33. The transmitter 50 includes, for example, the branch points $H_1$, $H_2$, and $H_3$, and nine resistor elements R provided in proximity to the branch points $H_1$, $H_2$, and $H_3$ in the respective signal lines $P_{11}$, $P_{12}$, $P_{13}$, $P_{21}$, $P_{22}$, $P_{23}$, $P_{31}$, $P_{32}$, and $P_{33}$. The transmitter 50 further includes, for example, nine coupling terminals $T_{11}$, $T_{12}$, $T_{13}$, $T_{21}$, $T_{22}$, $T_{23}$, $T_{31}$, $T_{32}$, and $T_{33}$ coupled to ends on a side opposite to the branch points $H_1$, $H_2$, and $H_3$ of the respective signal line signal line $P_{11}$, $P_{12}$, $P_{13}$, $P_{21}$, $P_{22}$, $P_{23}$, $P_{31}$, $P_{32}$, and $P_{33}$.

As described above, in the present modification example, a portion including the branch points $H_p$ and $H_n$ or the branch points $H_1$, $H_2$, and $H_3$, and the respective element resistors R may include a transmitter such as an IC (Integrated Circuit) and a module. This makes it possible to easily construct the transmission path P.

It should be noted that in the present modification example, a switch element may be provided. The switch element changes the number of branches at the branch points $H_p$ and $H_n$ or the branch points $H_1$, $H_2$, and $H_3$.

The transmitter 10 in FIG. 29 may include a switch element SW1 that changes the number of branches at the branch point $H_p$ and a switch element SW2 that changes the number of branches at the branch point $H_n$, for example, as illustrated in FIG. 34. The switch element SW1 includes a switch that performs coupling and decoupling between the branch point $H_p$ and the resistor element R in the signal line $P_{1p}$, a switch that performs coupling and decoupling between the branch point $H_p$ and the resistor element R in the signal line $P_{2p}$, and a wiring line that couples the branch point $H_p$ and the signal line $P_{3p}$ to each other. The switch element SW1 turns on and off the two internal switches in accordance with a control signal from outside. The switch element SW1 couples, for example, at least one of the signal line $P_{1p}$ or $P_{2p}$ and the signal line $P_{3p}$ to each other in accordance with a control signal from outside. The switch element SW2 includes a switch that performs coupling and decoupling between the branch point $H_n$ and the resistor element R in the signal line $P_{1n}$, a switch that performs coupling and decoupling between the branch point $H_n$ and the resistor element R in the signal line $P_{2n}$, and a wiring line that couples the branch point $H_n$ and the signal line $P_{3n}$ to each other. The switch element SW2 turns on and off the two internal switches in accordance with a control signal from outside. The switch element SW2 couples, for example, at least one of the signal line $P_{1n}$ or Pen and the signal line $P_{3n}$ to each other in accordance with a control signal from outside.

The transmitter 20 in FIG. 30 may include a switch element SW3 that changes the number of branches at the branch point $H_p$ and a switch element SW4 that changes the number of branches at the branch point $H_n$, for example, as illustrated in FIG. 35. The switch element SW3 includes a switch that performs coupling and decoupling between the branch point $H_p$ and the resistor element R in the signal line $P_{1p}$, a switch that performs coupling and decoupling between the branch point $H_p$ and the resistor element R in the signal line $P_{2p}$, a switch that performs coupling and decoupling between the branch point $H_p$ and the resistor element R in the signal line $P_{3p}$, and a wiring line that couples the branch point $H_p$ and the signal line $R_{3p}$ to each other. The switch element SW3 turns on and off the three internal switches in accordance with a control signal from outside. The switch element SW3 couples, for example, at least one of the signal line $P_{1p}$, $P_{2p}$, or $R_{3p}$ and the signal line $P_{3p}$ to each other in accordance with a control signal from outside. The switch element SW4 includes a switch that performs coupling and decoupling between the branch point $H_n$ and the resistor element R in the signal line $P_{1n}$, a switch that performs coupling and decoupling between the branch point $H_n$ and the resistor element R in the signal line $P_{2n}$, a switch that performs coupling and decoupling between the branch point $H_n$ and the resistor element R in the signal line $P_{3n}$, and a wiring line that couples the branch point $H_n$ and the signal line $P_{4n}$ to each other. The switch element SW4 turns on and off the three internal switches in accordance with a control signal from outside. The switch element SW4 couples, for example, at least one of the signal line $P_{1n}$, $P_{2n}$, or $P_{4n}$ and the signal line $P_{3n}$ to each other in accordance with a control signal from outside.

The transmitter 30 in FIG. 31 may include a switch element SW5 that changes the number of branches at the branch point $H_p$ and a switch element SW6 that changes the number of branches at the branch point $H_n$, for example, as illustrated in FIG. 36. The switch element SW5 includes a switch that performs coupling and decoupling between the branch point $H_p$ and the resistor element R in the signal line $P_{1p}$, a switch that performs coupling and decoupling between the branch point $H_p$ and the resistor element R in the signal line $P_{2p}$, and a wiring line that couples the branch point $H_p$ and the signal line $P_{3p}$ to each other. The switch element SW5 turns on and off the two internal switches in accordance with a control signal from outside. The switch element SW5 couples, for example, at least one of the signal line $P_{1p}$ or $P_{2p}$ and the signal line $P_{3p}$ to each other in accordance with a control signal from outside. The switch element SW6 includes a switch that performs coupling and decoupling between the branch point $H_n$ and the resistor element R in the signal line $P_{1n}$, a switch that performs coupling and decoupling between the branch point $H_n$ and the resistor element R in the signal line $P_{2n}$, and a wiring line that couples the branch point $H_n$ and the signal line $P_{3n}$ to each other. The switch element SW6 turns on and off the two internal switches in accordance with a control signal from outside. The switch element SW6 couples, for example, at least one of the signal line $P_{1n}$ or Pen and the signal line $P_{3n}$ to each other in accordance with a control signal from outside.

The transmitter 40 in FIG. 32 may include a switch element SW7 that changes the number of branches at the branch point $H_p$ and a switch element SW8 that changes the number of branches at the branch point $H_n$, for example, as illustrated in FIG. 37. The switch element SW7 includes a switch that performs coupling and decoupling between the branch point $H_p$ and the resistor element R in the signal line $P_{1p}$, a switch that performs coupling and decoupling between the branch point $H_p$ and the resistor element R in the signal line $P_{2p}$, and a wiring line that couples the branch point $H_p$ and the signal line $P_{3p}$ to each other. The switch element SW7 turns on and off the two internal switches in accordance with a control signal from outside. The switch element SW7 couples, for example, at least one of the signal line $P_{1p}$ or $P_{2p}$ and the signal line $P_{3p}$ to each other in accordance with a control signal from outside. The switch element SW8 includes a switch that performs coupling and decoupling between the branch point $H_n$ and the resistor element R in the signal line $P_{1n}$, a switch that performs coupling and decoupling between the branch point $H_n$ and the resistor element R in the signal line $P_{2n}$, and a wiring line that couples the branch point $H_n$ and the signal line $P_{3n}$ to each other. The switch element SW8 turns on and off the two internal switches in accordance with a control signal from outside. The switch element SW8 couples, for example, at least one of the signal line $P_{1n}$ or Pen and the signal line $P_{3n}$ to each other in accordance with a control signal from outside.

The transmitter 50 in FIG. 33 may include a switch element SW9 that changes the number of branches at the branch point $H_1$, a switch element SW10 that changes the number of branches at the branch point $H_2$, and a switch element SW11 that changes the number of branches at the branch point $H_3$ for example, as illustrated in FIG. 38. The switch element SW9 includes a switch that performs coupling and decoupling between the branch point $H_1$ and the resistor element R in the signal line $P_{11}$, a switch that performs coupling and decoupling between the branch point $H_1$ and the resistor element R in the signal line $P_{21}$, and a wiring line that couples the branch point $H_1$ and the resistor element R in the signal line $P_{31}$ to each other. The switch element SW9 turns on and off the two internal switches in accordance with a control signal from outside. The switch element SW9 couples, for example, at least one of the signal line $P_{11}$ or $P_{21}$ and the signal line $P_{31}$ to each other in accordance with a control signal from outside. The switch element SW10 includes a switch that performs coupling and decoupling between the branch point $H_2$ and the resistor element R in the signal line $P_{12}$, a switch that performs coupling and decoupling between the branch point $H_2$ and the resistor element R in the signal line $P_{22}$, and a wiring line that couples the branch point $H_2$ and the resistor element R in the signal line $P_{32}$ to each other. The switch element SW10 turns on and off the two internal switches in accordance with a control signal from outside. The switch element SW10 couples, for example, at least one of the signal line $P_{12}$ or $P_{22}$ and the signal line $P_{32}$ to each other in accordance with a control signal from outside. The switch element SW11 includes a switch that performs coupling and decoupling between the branch point $H_3$ and the resistor element R in the signal line $P_{13}$, a switch that performs coupling and decoupling between the branch point $H_3$ and the resistor element R in the signal line $P_{23}$, and a wiring line that couples the branch point $H_3$ and the resistor element R in the signal line $P_{33}$ to each other. The switch element SW10 turns on and off the two internal switches in accordance with a control signal from outside. The switch element SW11 couples, for example, at least one of the signal line $P_{13}$ or $P_{23}$ and the signal line $P_{33}$ to each other in accordance with a control signal from outside.

As described above, in the present modification example, the switch element that changes the number of branches at the branch point $H_p$ and $H_n$ or the branch point $H_1$, $H_2$, and $H_3$ is provided, which makes it possible to easily change the transmission path P in accordance with a purpose.

Incidentally, in the present modification example, each of the resistor elements R may include a variable resistor element having a resistance value variable in accordance with a control signal from outside. The resistance value of each of the resistor elements R is changed in synchronization with timing of switching between signal output and termination, for example. In such a case, it is possible to easily adjust the transmission path P in accordance with a purpose.

6. APPLICATION EXAMPLES

In the following, description is given of application examples of the communication systems 1 to 4 according to the respective embodiments and the modification examples thereof described above.

Application Example 1

FIG. 39 illustrates an appearance of a smartphone 5 (a multifunctional mobile phone) to which any of the communication systems 1 to 4 according to the respective embodiments and the modification examples thereof described above is applied. Various devices are mounted in the smartphone 5. Any of the communication systems 1 to 4 according to the respective embodiments and the modification examples thereof described above is applied to a communication system in which data are exchanged among these devices.

FIG. 40 illustrates a configuration example of an application processor 310 to be used in the smartphone 5. The application processor 310 includes a CPU (Central Processing Unit) 311, a memory controller 312, a power source controller 313, an external interface 314, an MIPI interface 315, a GPU (Graphics Processing Unit) 316, a media processor 317, a display controller 318, and an MIPI interface 319. In this example, the CPU 311, the memory controller 312, the power source controller 313, the external interface 314, the MIPI interface 315, the GPU 316, the media processor 317, and the display controller 318 are each coupled to a system bus 320 to allow for data exchange with one another via the system bus 320.

The CPU 311 processes various pieces of information handled in the smartphone 5 in accordance with a program. The memory controller 312 controls a memory 501 to be used in a case where the CPU 311 performs information processing. The power source controller 313 controls a power source of the smartphone 5.

The external interface 314 is an interface for communication with external devices. In this example, the external interface 314 is coupled to a wireless communication section 502. The wireless communication section 502 performs wireless communication with mobile phone base stations. The wireless communication section 502 includes, for example, a baseband section, an RF (radio frequency) front end section, and the like.

The MIPI interface 315 receives an image signal from an image sensor 410. For example, any of the communication systems 1 to 4 according to the respective embodiments and the modification examples thereof described above is applied to a communication system between the MIPI interface 315 and the image sensor 410. The image sensor 410 acquires an image, and includes, for example, a CMOS sensor.

The GPU 316 performs image processing. The media processor 317 processes information such as voice, characters, and graphics. The display controller 318 controls a display 504 via the MIPI interface 319.

The MIPI interface 319 transmits an image signal to the display 504. As the image signal, for example, a signal such as a YUV-format signal and an RGB-format signal is usable. For example, any of the communication systems 1 to 4 according to the respective embodiments and the modification examples thereof described above is applied to a communication system between the MIPI interface 319 and the display 504.

FIG. 41 illustrates a configuration example of the image sensor 410. The image sensor 410 includes a sensor section 411, an ISP (Image Signal Processor) 412, a JPEG (Joint Photographic Experts Group) encoder 413, a CPU 414, a RAM (Random Access Memory) 415, a ROM (Read Only Memory) 416, a power source controller 417, an I$^2$C (Inter-Integrated Circuit) interface 418, and an MIPI interface 419. In this example, these respective blocks are coupled to a system bus 420 to allow for data exchange with one another via the system bus 420.

The sensor section 411 acquires an image, and includes, for example, a CMOS sensor. The ISP 412 performs predetermined processing on the image acquired by the sensor section 411. The JPEG encoder 413 encodes the image processed by the ISP 412 to generate a JPEG-format image. The CPU 414 controls respective blocks of the image sensor 410 in accordance with a program. The RAM 415 is a memory to be used in a case where the CPU 414 performs information processing. The ROM 416 stores a program to be executed in the CPU 414. The power source controller 417 controls a power source of the image sensor 410. The I$^2$C interface 418 receives a control signal from the application processor 310. In addition, although not illustrated, the image sensor 410 also receives a clock signal from the application processor 310, in addition to the control signal. Specifically, the image sensor 410 is configured to be operable on the basis of clock signals with various frequencies.

The MIPI interface 419 transmits an image signal to the application processor 310. As the image signal, for example, a signal such as a YUV-format signal and an RGB-format signal is usable. For example, any of the communication systems 1 to 4 according to the respective embodiments and the modification examples thereof described above is applied to a communication system between the MIPI interface 419 and the application processor 310.

Application Example 3

FIG. 42 and FIG. 43 each illustrate a configuration example of a vehicle-mounted camera as an application example to an imaging device. FIG. 42 illustrates an installation example of the vehicle-mounted camera, and FIG. 43 illustrates an internal configuration example of the vehicle-mounted camera.

For example, vehicle-mounted cameras 401, 402, 403, and 404 are respectively mounted on the front (front), left, right, and rear (rear) of a vehicle 301, as illustrated in FIG.

42. The vehicle-mounted cameras 401 to 404 are each coupled to an ECU (Electrical Control Unit) 302 via an in-vehicle network.

An image capturing angle of the vehicle-mounted camera 401 mounted on the front of the vehicle 301 is within a range indicated by "a" in FIG. 42, for example. An image capturing angle of the vehicle-mounted camera 402 is within a range indicated by "b" in FIG. 42, for example. An image capturing angle of the vehicle-mounted camera 403 is within a range indicated by "c" in FIG. 42, for example.

An image capturing angle of the vehicle-mounted camera 404 is within a range indicated by "d" in FIG. 42, for example. Each of the vehicle-mounted cameras 401 to 404 outputs a captured image to the ECU 302. This consequently makes it possible to capture a 360-degree (omnidirectional) image on the front, right, left, and rear of the vehicle 301 in the ECU 302.

For example, each of the vehicle-mounted cameras 401 to 404 includes an image sensor 431, a DSP (Digital Signal Processing) circuit 432, a selector 433, and a SerDes (SERializer/DESerializer) circuit 434, as illustrated in FIG. 43.

The DSP circuit 432 performs various kinds of image signal processing on an imaging signal outputted from the image sensor 431. The SerDes circuit 434 performs serial-parallel conversion of a signal, and includes, for example, a vehicle-mounted interface chip such as FPD-Link III.

The selector 433 selects whether to output the imaging signal outputted from the image sensor 431 via the DSP circuit 432 or not via the DSP circuit 432.

Any of the communication systems 1 to 4 according to the respective embodiments and the modification examples thereof described above is applicable to, for example, a coupling interface 441 between the image sensor 431 and the DSP circuit 432. Moreover, any of the communication systems 1 to 4 according to the respective embodiments and the modification examples thereof described above is applicable to, for example, a coupling interface 442 between the image sensor 431 and the selector 433.

Although the present disclosure has been described above referring to a plurality of embodiments and the modification examples thereof, the present disclosure is not limited to the embodiments and the like described above, and may be modified in a variety of ways. It should be noted that effects described herein are merely illustrative. The effects of the present disclosure are not limited to those described in the specification. The present disclosure may have effects other than those described in the specification.

In addition, for example, the present disclosure may have the following configurations.

(1)

A communication system that transmits a signal from a plurality of transmission devices to one reception device via a transmission path, the transmission path including a branch point at a midpoint, including a plurality of first signal lines that couples the transmission devices and the branch point to each other, and further including a second signal line that couples the branch point and the reception device to each other, and of the plurality of first signal lines or the second signal line, at least the plurality of first signal lines having a resistor element in proximity to the branch point.

(2)

The communication system according to (1), in which the transmission path includes signal lines that are differential, and each of the signal lines includes the branch point, the plurality of first signal lines, and the second signal line.

(3)

The communication system according to (2), in a case where one first transmission device of the plurality of transmission devices outputs the signal, output of one or a plurality of second transmission devices other than the first transmission device of the plurality of transmission devices is stopped, and the second transmission devices are differentially terminated.

(4)

The communication system according to (1), in which the transmission path includes three signal lines, and each of the signal lines includes the branch point, the plurality of signal lines, and the second signal line.

(5)

The communication system according to (4), in which one first transmission device of the plurality of transmission devices outputs the signal, output of one or a plurality of second transmission devices other than the first transmission device of the plurality of transmission devices is stopped, and the second transmission devices are differentially terminated.

(6)

The communication system according to any one of (1) to (5), in which each of the plurality of first signal lines and the second signal includes a resistor element in proximity to the branch point, and the resistor element has a resistance value represented by the following expression.

$$R = ((\text{number of branches} - 1) \times Z_0 - R_T/2)/\text{number of branches}$$

$Z_0$: a characteristic impedance of each of the first signal lines and the second signal line $R_T/2$: a terminator resistor of each of the transmission devices and the reception device (7)

The communication system according to any one of (1) to (5), in which each of the first signal lines includes a resistor element in proximity to the branch point, and the resistor element has a resistance value obtained by solving the following expression.

$$R^2 + \left(\frac{3}{2}R_T - Z_0\right)R + \frac{R_T}{2}\left(\frac{R_T}{2} - 2Z_0\right) = 0 \qquad [\text{Math. 2}]$$

$Z_0$: a characteristic impedance of the first signal line $R_T/2$: a terminator resistor of each of the transmission device and the reception device (8)

A transmitter to be used for a communication system that transmits a signal from a plurality of transmission devices to one reception device, the transmitter including:

a branch point;

a plurality of first signal lines that couples the transmission devices and the branch point to each other;

a second signal line that couples the branch point and the reception device to each other; and a plurality of resistor elements provided in proximity to the branch point in at least the plurality of first signal lines of the plurality of first signal lines or the second signal line.

(9)

The transmitter according to (8), in which each of the resistor elements includes a variable resistor element.

(10)

The transmitter according to (8) or (9), further including a switch element that changes number of branches at the branch point.

According to the communication system and the transmitter according to the embodiments of the present disclosure, it is possible to achieve multipoint bus transmission suitable for high-speed transmission. It should be noted that the effects of the present disclosure are not necessarily limited to the effects described here, and may be any of the effects described in the specification.

This application claims the benefit of Japanese Priority Patent Application JP2018-009330 filed with the Japan Patent Office on Jan. 24, 2018, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A communication system that transmits a signal from transmission devices including a first transmission device and a second transmission device to a reception device via a transmission path,
the transmission path including a first branch point a second branch point and a third branch point, a first plurality of transmission-side signal lines respectively coupling the first transmission device to the first, second and third branch points, a second plurality of transmission-side signal lines respectively coupling the second transmission device to the first, second and third branch points, and a plurality of reception-side signal lines respectively coupling the reception device to the first, second and third branch points, and
the first and second transmission devices and the reception devices are directly electrically connected to the first, second and third branch points via respective single resistor elements connected to the first plurality of transmission-side signal lines, the second plurality of transmission-side signal lines, and the plurality of reception-side signal lines, wherein
the resistor elements respectively have a resistance value represented by the following expression:

$R=((\text{number of branches}-1) \times Z_0 - R_T/2)/\text{number of branches}$ $Z_0$: a characteristic impedance of each of the first signal lines and the second signal line
$R_T/2$: a terminator resistor of each of the transmission devices and the reception device.

2. The communication system according to claim 1, wherein
in a case where the first transmission device outputs the signal, output of the second transmission device is stopped.

3. The communication system according to claim 1, wherein
each of the resistor elements includes a variable resistor element.

4. The communication system according to claim 1, further comprising:
at least one switch element arranged between one of the resistor elements and one of the first, second or third branch points to selectively employ the electrical connection of the first transmission device, the second transmission device or the reception device to a corresponding one of the first, second or third branch points.

5. A communication system that transmits a signal from transmission devices including a first transmission device and a second transmission device to a reception device via a transmission path,
the transmission path including a first branch point a second branch point and a third branch point, a first plurality of transmission-side signal lines respectively coupling the first transmission device to the first, second and third branch points, a second plurality of transmission-side signal lines respectively coupling the second transmission device to the first, second and third branch points, and a plurality of reception-side signal lines respectively coupling the reception device to the first, second and third branch points, and
the first and second transmission devices and the reception devices are directly electrically connected to the first, second and third branch points via respective single resistor elements connected to the first plurality of transmission-side signal lines, the second plurality of transmission-side signal lines, and the plurality of reception-side signal lines, wherein
the resistor elements respectively have a resistance value obtained by solving the following expression:

$$R^2 + \left(\frac{3}{2}R_T - Z_0\right)R + \frac{R_T}{2}\left(\frac{R_T}{2} - 2Z_0\right) = 0$$

$Z_0$: a characteristic impedance of the first signal line
$R_T/2$: a terminator resistor of each of the transmission device and the reception device.

6. A transmitter to be used for a communication system that transmits a signal from transmission devices including a first transmission device and a second transmission device to a reception device, the transmitter comprising:
a first branch point a second branch point and a third branch point, a first plurality of transmission-side signal lines respectively coupling the first transmission device to the first, second and third branch points, a second plurality of transmission-side signal lines respectively coupling the second transmission device to the first, second and third branch points, and a plurality of reception-side signal lines respectively coupling the reception device to the first, second and third branch points, and
the first and second transmission devices and the reception devices are directly electrically connected to the first, second and third branch points via respective single resistor elements connected to the first plurality of transmission-side signal lines, the second plurality of transmission-side signal lines, and the plurality of reception-side signal lines, wherein
the resistor elements respectively have a resistance value represented by the following expression:

$R=((\text{number of branches}-1) \times Z_0 - R_T/2)/\text{number of branches}$ $Z_0$: a characteristic impedance of each of the first signal lines and the second signal line
$R_T/2$: a terminator resistor of each of the transmission devices and the reception device.

7. The transmitter according to claim 6, wherein
each of the resistor elements includes a variable resistor element.

8. The transmitter according to claim 6, further comprising:
at least one switch element arranged between one of the resistor elements and one of the first, second or third branch points to selectively employ the electrical connection of the first transmission device, the second transmission device or the reception device to a corresponding one of the first, second or third branch points.

9. The transmitter according to claim 6, wherein
in a case where the first transmission device outputs the signal, output of the second transmission device is stopped.

10. A transmitter to be used for a communication system that transmits a signal from transmission devices including a first transmission device and a second transmission device to a reception device, the transmitter comprising:
a first branch point a second branch point and a third branch point, a first plurality of transmission-side signal lines respectively coupling the first transmission device to the first, second and third branch points, a second plurality of transmission-side signal lines respectively coupling the second transmission device to the first, second and third branch points, and a plurality of reception-side signal lines respectively coupling the reception device to the first, second and third branch points, and the first and second transmission devices and the reception devices are directly electrically connected to the first, second and third branch points via respective single resistor elements connected to the first plurality of transmission-side signal lines, the second plurality of transmission-side signal lines, and the plurality of reception-side signal lines, wherein the resistor elements respectively have a resistance value obtained by solving the following expression:

$$R^2 + \left(\frac{3}{2}R_T - Z_0\right)R + \frac{R_T}{2}\left(\frac{R_T}{2} - 2\ Z_0\right) = 0$$

$Z_0$: a characteristic impedance of the first signal line
$R_T/2$: a terminator resistor of each of the transmission device and the reception device.

\* \* \* \* \*